United States Patent
L'Heureux et al.

(10) Patent No.: US 8,271,636 B2
(45) Date of Patent: Sep. 18, 2012

(54) RULE-BASED NETWORKING DEVICE

(75) Inventors: Israel L'Heureux, Campbell, CA (US);
Steve Malmskog, Campbell, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 149 days.

(21) Appl. No.: 12/557,240

(22) Filed: Sep. 10, 2009

(65) Prior Publication Data
US 2009/0327827 A1 Dec. 31, 2009

Related U.S. Application Data

(63) Continuation of application No. 10/996,871, filed on Nov. 23, 2004, now Pat. No. 7,610,400.

(51) Int. Cl.
*G06F 15/173* (2006.01)
*G06F 15/16* (2006.01)

(52) U.S. Cl. ........ 709/223; 709/217; 709/219; 709/225; 709/227; 709/228; 709/229; 709/238; 709/239

(58) Field of Classification Search .................. 709/217, 709/219, 223, 225, 227–229, 238–239
See application file for complete search history.

(56) References Cited

U.S. PATENT DOCUMENTS

| | | |
|---|---|---|
| 5,727,159 A | 3/1998 | Kikinis |
| 5,838,927 A | 11/1998 | Gillon et al. |
| 5,864,366 A | 1/1999 | Yeo |
| 5,875,330 A * | 2/1999 | Goti ............................. 717/104 |
| 5,918,013 A | 6/1999 | Mighdoll et al. |
| 6,029,182 A | 2/2000 | Nehab et al. |
| 6,031,989 A | 2/2000 | Cordell |
| 6,049,342 A | 4/2000 | Nielsen et al. |
| 6,049,821 A | 4/2000 | Theriault et al. |
| 6,058,428 A | 5/2000 | Wang et al. |
| 6,081,835 A | 6/2000 | Antcliff et al. |
| 6,092,099 A | 7/2000 | Irie et al. |
| 6,122,666 A | 9/2000 | Beurket et al. |
| 6,128,655 A | 10/2000 | Fields et al. |
| 6,157,924 A | 12/2000 | Austin |
| 6,247,048 B1 | 6/2001 | Greer et al. |

(Continued)

FOREIGN PATENT DOCUMENTS

EP 0811939 12/1997

(Continued)

OTHER PUBLICATIONS

Mohan et al., "Content Adaptation Framework," IEEE, Global Telecommunications Network, 1999, vol. 4, pp. 2015-2021.

(Continued)

*Primary Examiner* — Emmanuel L Moise
*Assistant Examiner* — Edward Kim
(74) *Attorney, Agent, or Firm* — Shumaker & Sieffert, P.A.

(57) ABSTRACT

A networking system, device, and method are provided. The networking device typically includes a user-defined ruleset including HTTP request rules and HTTP response rules. The networking device may further include a request processor configured to receive an incoming HTTP request from the client, apply HTTP request rules to the incoming HTTP request, to thereby produce a modified HTTP request, and send the modified HTTP request to the server. The networking device may further include a response processor configured to receive an HTTP response to the modified HTTP request from the server, apply the HTTP response rules to the HTTP response, to thereby produce a modified HTTP response, and send the modified HTTP response to the client.

27 Claims, 16 Drawing Sheets

U.S. PATENT DOCUMENTS

| | | | |
|---|---|---|---|
| 6,266,369 B1 | 7/2001 | Wang et al. | |
| 6,275,301 B1 | 8/2001 | Bobrow et al. | |
| 6,275,829 B1 | 8/2001 | Angiulo et al. | |
| 6,300,959 B1 | 10/2001 | Gabler et al. | |
| 6,304,676 B1 | 10/2001 | Mathews | |
| 6,311,223 B1 | 10/2001 | Bodin et al. | |
| 6,317,790 B1 | 11/2001 | Bowker et al. | |
| 6,332,131 B1 | 12/2001 | Grandcolas et al. | |
| 6,345,279 B1 | 2/2002 | Li et al. | |
| 6,377,928 B1 | 4/2002 | Saxena et al. | |
| 6,389,431 B1 * | 5/2002 | Frolund et al. | 1/1 |
| 6,405,222 B1 | 6/2002 | Kunzinger et al. | |
| 6,421,733 B1 | 7/2002 | Tso et al. | |
| 6,424,981 B1 | 7/2002 | Isaac et al. | |
| 6,438,125 B1 | 8/2002 | Brothers | |
| 6,449,658 B1 | 9/2002 | Lafe et al. | |
| 6,470,027 B1 | 10/2002 | Birrell, Jr. | |
| 6,491,509 B1 | 12/2002 | Schad et al. | |
| 6,535,896 B2 | 3/2003 | Britton et al. | |
| 6,546,388 B1 | 4/2003 | Edlund et al. | |
| 6,557,005 B1 | 4/2003 | Burget | |
| 6,563,517 B1 | 5/2003 | Bhagwat et al. | |
| 6,564,250 B1 | 5/2003 | Nguyen | |
| 6,578,073 B1 | 6/2003 | Starnes et al. | |
| 6,601,108 B1 | 7/2003 | Marmor | |
| 6,615,266 B1 | 9/2003 | Hoffman, Jr. et al. | |
| 6,631,298 B1 | 10/2003 | Pagnano et al. | |
| 6,636,894 B1 | 10/2003 | Short et al. | |
| 6,704,024 B2 | 3/2004 | Robotham et al. | |
| 6,728,785 B1 | 4/2004 | Jungck | |
| 6,742,043 B1 | 5/2004 | Moussa et al. | |
| 6,760,759 B1 | 7/2004 | Chan | |
| 6,810,409 B1 | 10/2004 | Fry et al. | |
| 6,834,297 B1 | 12/2004 | Peiffer et al. | |
| 6,925,595 B1 | 8/2005 | Whitledge et al. | |
| 6,948,174 B2 | 9/2005 | Chiang et al. | |
| 6,957,390 B2 | 10/2005 | Tamir et al. | |
| 6,970,918 B2 | 11/2005 | Brown et al. | |
| 6,976,090 B2 | 12/2005 | Ben-Shaul et al. | |
| 6,993,476 B1 | 1/2006 | Dutta et al. | |
| 7,047,281 B1 | 5/2006 | Kausik | |
| 7,055,028 B2 | 5/2006 | Peiffer et al. | |
| 7,062,570 B2 | 6/2006 | Hong et al. | |
| 7,072,984 B1 | 7/2006 | Polonsky et al. | |
| 7,127,503 B2 | 10/2006 | Malrnskog | |
| 7,249,196 B1 | 7/2007 | Peiffer et al. | |
| 7,308,490 B2 | 12/2007 | Peiffer et al. | |
| 7,392,539 B2 * | 6/2008 | Brooks et al. | 726/11 |
| 7,493,359 B2 * | 2/2009 | Fitzpatrick et al. | 709/202 |
| 7,552,222 B2 * | 6/2009 | Garimella et al. | 709/229 |
| 7,610,400 B2 | 10/2009 | L'Heureux et al. | |
| 2002/0071436 A1 | 6/2002 | Border et al. | |
| 2002/0078164 A1 | 6/2002 | Reinschmidt | |
| 2002/0078191 A1 * | 6/2002 | Lorenz | 709/223 |
| 2002/0091753 A1 * | 7/2002 | Reddy et al. | 709/202 |
| 2002/0112078 A1 | 8/2002 | Yach | |
| 2002/0129279 A1 * | 9/2002 | Spacey | 713/201 |
| 2003/0023712 A1 * | 1/2003 | Zhao et al. | 709/223 |
| 2003/0037108 A1 * | 2/2003 | Peiffer et al. | 709/203 |
| 2003/0051002 A1 | 3/2003 | Bogia et al. | |
| 2003/0061275 A1 | 3/2003 | Brown et al. | |
| 2004/0044768 A1 | 3/2004 | Takahashi | |
| 2004/0249975 A1 * | 12/2004 | Tuck et al. | 709/245 |
| 2005/0091386 A1 * | 4/2005 | Kuno et al. | 709/228 |
| 2005/0154690 A1 | 7/2005 | Nitta et al. | |
| 2006/0265689 A1 | 11/2006 | Kuznetsov et al. | |
| 2008/0027824 A1 | 1/2008 | Callaghan et al. | |
| 2009/0327827 A1 * | 12/2009 | L'Heureux et al. | 714/748 |

FOREIGN PATENT DOCUMENTS

| | | |
|---|---|---|
| EP | 0994426 | 4/2000 |
| JP | 10/224523 | 8/1998 |
| JP | 10/228437 | 8/1998 |
| JP | 10/254888 | 9/1998 |
| JP | 10/283233 | 10/1998 |
| JP | 10/285502 | 10/1998 |
| JP | 10/301943 | 11/1998 |
| JP | 2000-076155 | 3/2000 |
| JP | 2000-090001 | 3/2000 |
| JP | 2000-194612 | 7/2000 |
| WO | WO 00/68832 | 11/2000 |
| WO | WO 01/27711 | 4/2001 |

OTHER PUBLICATIONS

Bharadvaj et al., "An Active Transcoding Proxy to Support Mobile Web Access," IEEE Symposium, Reliable Distributed Systems, Oct. 1998, pp. 118-123.

Spyglass, Inc., http://www.spyglass.com, http://webarchive.org/web/19990429034543/http://www.spyglass.com, Apr. 29, 1999.

Johnson, "Converting PC GUIs for NonPC Devices," Circuit Cellar Ink, Vernon, CT, US, pp. 40-42 and 44, vol. 91, Feb. 1998.

Fox et al., "Reducing WWW Latency and Bandwidth Requirements by Real-Time Distillation," Computer Networks and ISDN Systems, North Holland Publishing, Amsterdam, NL, pp. 1445-1456, vol. 28, No. 11, May 1996.

Weisdorf, "Anatomy of a Procmail Recipe, Part 1," Sep. 17, 2003.

"eekim.com," CGI Programming Slides, 1996, 2 pp.

Fielding, "Hypertext Transfer Protocol—HTTP/1.1," Network Working Group, RFC 2616, Jun. 1999, 165 pp.

Phelps et al., "The Multivalent Browser: A Platform for New Ideas," Proceedings of the 2001 ACM Symposium on Document Engineering, Nov. 9-10, 2001, 10 pp.

Simpson, "PPP Challenge Handshake Authentication Protocol (CHAP)," RFC 1994, Aug. 1996, 13 pp.

Zorn et al., "Microsoft PPP CHAP Extensions," RFC 2433, Oct. 1998, 19 pp.

Zorn, "Microsoft PPP CHAP Extensions, Version 2," RFC 2759, Jan. 2000, 19 pp.

* cited by examiner

Client HTTP Request ⟵ 22

```
Method URI HTTP Ver.  { GET http://www.redlinenetworks.com/home.html   HTTP/1.1
    General-header    { Connection: Keep-Alive
                      ⎧ Accept: image/gif image/x-xbitmap image/jpeg image/pjpeg */*
                      ⎪ Accept language: en-us
    Request-header    ⎨ Accept encoding: gzip deflate
                      ⎪ User agent: Mozilla 4.0 (compatible; MSIE 5.01; Windows NT)
                      ⎩ Host: redlinenetworks.com
     Entity-header    ⎧ Content-type:
                      ⎩ Content-length
       Entity-body    { query=???
```

FIG. 8

Server HTTP Response ⟵ 24

```
HTTP Ver. Status Code Reason { HTTP/1.1 200 OK
            General-header  { Date: Thur 02 Sept 2004 11:23:04 GMT
           Response-header  { Server: Apache 1.11
                             ⎧ Content-type: text/html
             Entity-header  ⎨ Content-length 645
                             ⎩ Last Modified: Thurs 03 Sept 2004 16:32:57 GMT
               Entity-body  ⎧ <title> Homepage </title>
                            ⎩ <h1>Welcome to Redline Networks</h1>
```

LOADING A RULESET: IMPORT RULESET <SCP|TFTP>://<FILE_PATH>/<RULESET_FILE>; VIEWING STATUS: SHOW CLUSTER N APPRULE [STATUS]

ASSIGNING A RULESET TO A CLUSTER: SET CLUSTER N APPRULE RULESET <RULESET_FILE>; VIEWING STATISTICS: SHOW CLUSTER N APPRULE STATS SHOW CLUSTER N APPRULE STATS [ALL|RS|RTH|PTH|PTC] [RULE#]

CLEARING A RULESET FROM A CLUSTER: CLEAR CLUSTER N APPRULE RULESET

ENABLING/DISABLING RULES: SET CLUSTER N APPRULE [ENABLED|DISABLED]; VIEWING RULE LOGS:SHOW LOG APPRULE

FIG. 13

RULE TYPE/SYNTAX MATRIX

| RULE TYPE | URL | QUERY_STRING | REQUEST_HEADER | ANY_REQUEST_HEADER | HTTP_REQUEST_VERSION | REPLY_HEADER | HTTP_REPLY_CODE | HTTP_REPLY_VERSION | HTTP_METHOD | SRC_IP (SIP) | CONTENTS | EXISTS (EX) | NOT_EXISTS (NX) | EQUALS (EQ) | CI_EQUALS (CI_EQ) | NOT_EQUALS (NE) | CI_NOT_EQUALS (CI_NE) | CONTAINS (C) | CI_CONTAINS (CI_C) | NOT_CONTAINS (NC) | CI_NOT_CONTAINS (CI_NC) | STARTS_WITH (SW) | CI_STARTS_WITH (CI_SW) | NOT_STARTS_WITH (NS) | CI_NOT_STARTS_WITH (CI_NS) | ENDS_WITH (EW) | CI_ENDS_WITH (CI_EW) | NOT_ENDS_WITH (NW) | CI_NOT_ENDS_WITH (CI_NW) | LENGTH_GREATER_THAN (L_GT) | LENGTH_LESS_THAN (L_LT) | LENGTH_EQUALS (L_EQ) | LENGTH_NOT_EQUALS (L_NE) |
|---|---|---|---|---|---|---|---|---|---|---|---|---|---|---|---|---|---|---|---|---|---|---|---|---|---|---|---|---|---|---|---|---|---|
| REQUEST SENTRY (RS) FOR REQUEST SENTRY RULES: WITH THE EXCEPTION OF THE LOG ACTION, TYPICALLY ONLY ONE ACTION MAY BE PRESENT IN A SINGLE RULE. FOR EXAMPLE, CLOSE_CONN AND REDIRECT MAY NOT CO-EXIST, BUT CLOSE_CONN AND LOG IS ACCEPTABLE. | ✓ | ✓ | ✓ | ✓ | ✓ |  |  |  | ✓ | ✓ |  | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ |
| REQUEST TRANSLATOR HEADER (RTH) | ✓ | ✓ | ✓ |  | ✓ |  |  |  | ✓ | ✓ |  | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ |  |  |  |  |
| PAGE TRANSLATOR CONTENT (PTC) | ✓ | ✓ |  |  |  |  |  |  |  |  | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ |  |  |  |  |
| PAGE TRANSLATOR HEADER (PTH) | ✓ | ✓ |  |  |  | ✓ | ✓ | ✓ |  |  |  | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ |  |  |  |  |

TEST OPERATORS

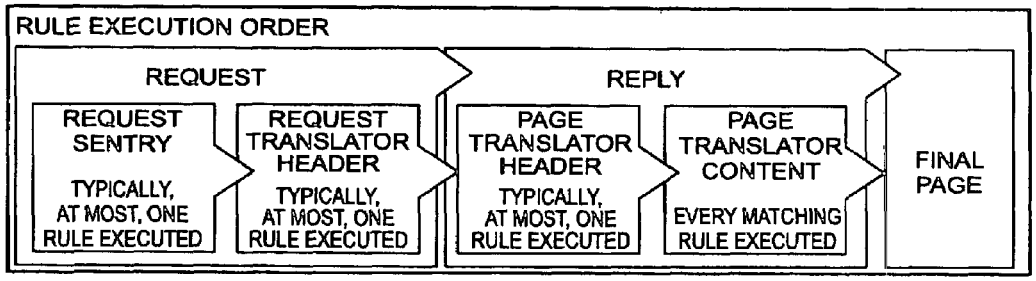

FIG. 15

VARIABLE/TEST OPERATOR RELATIONSHIPS

THIS TABLE LISTS THE TYPICAL RELATIONSHIPS BETWEEN THE VARIABLES AND TEST OPERATORS. NOTE THAT JUST BECAUSE A RELATIONSHIP EXISTS, DOES NOT MEAN THAT IT CAN BE USED FOR EVERY RULE. FOR EXAMPLE, THE URL VARIABLE CAN BE USED WITH THE VARIOUS LENGTH OPERATORS, BUT ONLY FOR REQUEST SENTRY RULES (SEE THE RULE TYPE/SYNTAX MATRIX ABOVE FOR WHICH RULES USE WHICH VARIABLES AND TEST OPERATORS).

| VARIABLES | (NOT_)EXISTS | (CI_)(NOT_)EQUALS | (CI_)(NOT_)CONTAINS | (CI_)(NOT_)STARTS_WITH | (CI_)(NOT_)ENDS_WITH | LENGTH_(GREATER/LESS)_THAN | LENGTH_(NOT_)EQUALS |
|---|---|---|---|---|---|---|---|
| URL | | ✓ | ✓ | ✓ | ✓ | ✓ | ✓ |
| QUERY_STRING | ✓ | ✓ | ✓ | ✓ | ✓ | ✓ | ✓ |
| REQUEST_HEADER | ✓ | ✓ | ✓ | ✓ | ✓ | ✓ | ✓ |
| ANY_REQUEST_HEADER | ✓ | ✓ | ✓ | ✓ | ✓ | ✓ | ✓ |
| HTTP_REQUEST_VERSION | ✓ | | | | | | |
| REPLY_HEADER | ✓ | ✓ | ✓ | ✓ | ✓ | ✓ | ✓ |
| HTTP_REPLY_CODE | | ✓ | ✓ | ✓ | ✓ | ✓ | ✓ |
| HTTP_REPLY_VERSION | ✓ | | | | | | |
| HTTP_METHOD | ✓ | | | | | | |
| SRC_IP (SIP) | | ✓ | ✓ | ✓ | | | |
| CONTENT | | | ✓ | | | | |

FIG. 16

GENERAL RULE SYNTAX

<RULE_TYPE>: <TEST_CONDITION> [...AND <TEST_CONDITION>] THEN <ACTION_STATEMENT> [...AND <ACTION_STATEMENT>]

WHERE
    <RULE_TYPE>        IS A VALID RULE TYPE (RS, RTH, PTH, PTC)
    <TEST_CONDITION>  IS A VALID TEST CONDITION OF THE FORM
                                <VARIABLE> <OPERATOR>["<ARGUMENT>"]
    <ACTION_STATEMENT>  IS A VALID ACTION STATEMENT OF THE
                                  FORM <ACTION> ["<ARGUMENT>"]

MULTIPLE TEST CONDITIONS AND ACTION STATEMENTS MAY BE JOINED TOGETHER IN A SINGLE RULE USING THE AND KEYWORD.

ALL USER-SUPPLIED ARGUMENTS SHOULD BE ENCLOSED IN DOUBLE QUOTES

FIG. 22

TEST CONDITION SYNTAX

THE TABLE BELOW LISTS EXAMPLE FORMATS FOR TEST CONDITIONS. LISTED ALONGSIDE THE FORMAT ARE THE VARIABLES AND TEST OPERATORS THAT ARE USED WITH THAT FORMAT ALONG WITH SOME EXAMPLES OF HOW THE FORMAT WOULD APPEAR WHEN USED IN ACTUAL RULES.

| TEST CONDITION FORMAT | EXAMPLES |
|---|---|
| VARIABLE/OPERATOR<br>VARIABLES: QUERY_STRING,<br>ANY_REQUEST_HEADER<br>TEST OPERATORS: (NOT_)EXISTS | QUERY_STRING NOT_EXISTS<br>ANY_REQUEST_HEADER EXISTS |
| VARIABLE/OPERATOR/ARGUMENT<br>VARIABLES: URL, QUERY_STRING, HTTP_REQUEST_VERSION,<br>HTTP_REPLY_CODE, HTTP_REPLY_VERSION,<br>HTTP_METHOD, SRC_IP, CONTENT, ANY_REQUEST_<br>HEADER<br>TEST OPERATORS: (CI_)(NOT_)EQUALS, (CI_)(NOT_)CONTAINS,<br>(CI_)(NOT_)STARTS_WITH, (CI_)(NOT_)ENDS_WITH,<br>LENGTH_GREATER_THAN, LENGTH_LESS_THAN,<br>LENGTH_(NOT_)EQUALS | URL STARTS_WITH "/DYNAMIC"<br>QUERY_STRING CI_CONTAINS "REDIRECT=YES"<br>HTTP_REPLY_CODE STARTS_WITH "5"<br>HTTP_METHOD NOT_EQUALS "GET"<br>SRC_IP STARTS_WITH "16.45"<br>CONTENT CONTAINS "HTTP://*.REDLINENETWORKS.COM"<br>URL LENGTH_GREATER_THAN "2873" |
| VARIABLE/NAME/OPERATOR<br>VARIABLES: REQUEST_HEADER, REPLY_HEADER<br>TEST OPERATORS: EXISTS | REQUEST_HEADER "USER-AGENT" EXISTS<br>REPLY_HEADER "SERVER" EXISTS |
| VARIABLE/NAME/OPERATOR/ARGUMENT<br>VARIABLES: REQUEST_HEADER, REPLY_HEADER<br>TEST OPERATORS: (CI_)(NOT_)EQUALS, (CI_)(NOT_)CONTAINS,<br>(CI_)(NOT_)STARTS_WITH, (CI_)(NOT_)ENDS_WITH,<br>LENGTH_GREATER_THAN, LENGTH_LESS_THAN,<br>LENGTH_(NOT_)EQUALS | REQUEST_HEADER "USER-AGENT" CI_<br>CONTAINS "WINDOWS"<br>REPLY_HEADER "SERVER" STARTS_<br>WITH "MICROSOFT" |

FIG. 23

ACTION SYNTAX

DUE TO THE CUSTOMIZABLE NATURE OF EACH ACTION, ACTION SYNTAX DOES NOT LEND ITSELF TO GENERALIZATION. AS SUCH, EACH ACTION IS SHOWN WITH ITS OWN SYNTAX AND WHERE POSSIBLE, SIMILAR ACTIONS ARE GROUPED TOGETHER. THE ACTUAL ACTIONS AS THEY APPEAR IN A RULE ARE LISTED BELOW THE ACTION TITLE. ADDITIONAL NOTES ARE ADDED WHERE APPROPRIATE.

| ACTION | EXAMPLES |
|---|---|
| INSERT REQUEST/REPLY HEADER <br> ACTION NAMES: INSERT_REQUEST_HEADER, INSERT_REPLY_HEADER <br><br> SYNTAX: INSERT_REQUEST_HEADER, "<HDR_NAME>" "<HDR_ARG>" <br>          INSERT_REPLY_HEADER <br><br> NOTES: INSERTION OF A HEADER TAKES PLACE WHETHER OR NOT THE HEADER EXISTS. IF IT ALREADY EXISTS, THE EXISTING HEADER IS FIRST DELETED, AND THE NEW ONE INSERTED. USE THIS ACTION IF YOU WANT THE HEADER TO APPEAR IN THE REQUEST OR REPLY UNDER ALL CIRCUMSTANCES. | INSERT_REQUEST_HEADER "ACCEPT-ENCODING" "GZIP" <br> INSERT_REPLY_HEADER "X-POWERED-BY" "REDLINE" |
| UPDATE REQUEST/REPLY HEADER <br> ACTION NAMES: UPDATE_REQUEST_HEADER, UPDATE_REPLY_HEADER <br><br> SYNTAX: UPDATE_REQUEST_HEADER, "<HDR_NAME>" "<HDR_ARG>" ["<HDR_ARG_N>"] <br>          UPDATE_REPLY_HEADER <br><br> NOTES: UPDATING A HEADER OCCURS ONLY IF THE HEADER ALREADY EXISTS IN THE REQUEST AND REPLY. IF THE HEADER DOES NOT EXIST, THEN NO ACTION IS PERFORMED. THIS ACTION CAN ALSO TAKE MULTIPLE ARGUMENTS WHICH WILL BE USED IN A ROUND-ROBIN FASHION. | UPDATE_REQUEST_HEADER "ACCEPT-ENCODING" "GZIP" <br> UPDATE_REPLY_HEADER "SERVER" "SERVER1" "SERVER2" "SERVER3" |
| DELETE REQUEST/REPLY HEADER <br> ACTION NAMES: DELETE_REQUEST_HEADER, DELETE_REPLY_HEADER <br><br> SYNTAX: DELETE_REQUEST_HEADER, "<HDR_NAME>" <br>          DELETE_REPLY_HEADER <br><br> NOTES: DELETING A HEADER WILL REMOVE ALL INSTANCES OF THAT HEADER FROM EITHER THE REQUEST OR THE REPLY. NOTE THAT NO ARGUMENT IS SPECIFIED; ONLY THE NAME OF THE HEADER IS NECESSARY. | DELETE_REQUEST_HEADER "ACCEPT-ENCODING" <br> DELETE_REPLY_HEADER "SERVER" |

FIG. 24

ACTION SYNTAX, CONTINUED

DUE TO THE CUSTOMIZABLE NATURE OF EACH ACTION, ACTION SYNTAX DOES NOT LEND ITSELF TO GENERALIZATION. AS SUCH, EACH ACTION IS SHOWN WITH ITS OWN SYNTAX AND WHERE POSSIBLE, SIMILAR ACTIONS ARE GROUPED TOGETHER. THE ACTUAL ACTIONS AS THEY APPEAR IN A RULE ARE LISTED BELOW THE ACTION TITLE. ADDITIONAL NOTES ARE ADDED WHERE APPROPRIATE.

| ACTION | EXAMPLES |
|---|---|
| PREPEND/APPEND/REPLACE (P/A/R)<br>ACTION NAMES: PREPEND, APPEND, REPLACE<br><br>SYNTAX: PREPEND [TERM] "<STRING>"<br>       APPEND<br>       REPLACE<br><br>NOTES: THE P/A/R ACTIONS OPERATE EITHER ON THE ENTIRE VALUE OR ON A SUBSTRING OF THE VALUE. IF THE TERM KEYWORD IS PRESENT, THEN THE SUBSTRING IS OPERATED AGAINST; OTHERWISE THE ENTIRE VALUE IS USED. | CONTENT CI_CONTAINS "HTTP://*.XYZ.COM" THEN PREPEND CONTENT TERM "HTTPS://GATEWAY.XYZ.COM"<br><br>URL CI_EQUALS "/PAGES/SHOWSTORY.ASP" AND QUERY_STRING EXISTS AND REQUEST_HEADER "USER-AGENT" CONTAINS "WINDOWS" THEN APPEND QUERY_STRING "&CHROME=IE_BROWSER" |
| CLOSE CLIENT CONNECTION<br>ACTION NAMES: CLOSE_CONN<br><br>SYNTAX: CLOSE_CONN <FIN|RST><br><br>NOTES: THE CONNECTION IS CLOSED USING EITHER A TCP "FIN" (WHICH INITIATES THE FOUR-WAY TEARDOWN) OR A "RST" (WHICH IMMEDIATELY TERMINATES THE CONNECTION). THIS ACTION IS ONLY USABLE WITH REQUEST SENTRY RULES. | URL LENGTH_GREATER_THAN "1238" THEN CLOSE_CONN FIN<br><br>URL ENDS WITH ".IDA" THEN CLOSE_CONN RST |

RULE-BASED NETWORKING DEVICE

This application is a continuation of U.S. patent application Ser. No. 10/996,871, filed Nov. 23, 2004, entitled "Rule-Based Networking Device," the entire contents of which is incorporated herein by reference.

TECHNICAL FIELD

The present invention relates generally to networking devices for use in computer networks, and more particularly to a system and method for rule-based operation of networking devices to manage web traffic.

BACKGROUND

Networking devices and servers are notoriously difficult to program. Technical courses and even college degrees are devoted to the topic, and every year millions of dollars are spent ensuring that information technology specialists gain the technical knowledge needed to deploy and configure networking devices and servers on computer networks. Technologies for developing dynamically generated HTML pages, such as PHP and Active Server Pages (ASP) may be used to implement specialized functionality for management of web traffic, however these technologies are also complex, and development costs are high.

It is known in the networking arts to configure a Server Load Balancer (SLB) to read an incoming request and route the incoming request to a target server based on the URL or a header component of the request. However, SLBs merely function to direct in-bound requests to a suitable server, and direct server responses back to the correct clients. SLBs are not capable of modifying any aspect of a request, such as the URL or header. Further, SLBs are not capable not of modifying response headers, nor reading or modifying response content. This limits the utility of SLBs to being traffic directors, and prevents them from being used to manage network traffic in a manner that alters the URL, headers, and content of the requests and responses that flow through these devices, according to user preferences.

It would be desirable to provide a simple and effective system and method for configuring a networking device to manage network traffic between clients and servers according to a set of user-specified rules.

SUMMARY

A networking system, device, and method are provided. The networking device typically includes a user-defined ruleset including HTTP request rules and HTTP response rules. The networking device may further include a request processor configured to receive an incoming HTTP request from the client, apply HTTP request rules to the incoming HTTP request, to thereby produce a modified HTTP request, and send the modified HTTP request to the server. The networking device may further include a response processor configured to receive an HTTP response to the modified HTTP request from the server, apply the HTTP response rules to the HTTP response, to thereby produce a modified HTTP response, and send the modified HTTP response to the client.

The networking method typically includes providing a user-defined ruleset executable by the networking device, the ruleset including HTTP requests rules and HTTP response rules. The method may further include receiving an incoming HTTP request from the client at the networking device, applying HTTP request rules to the incoming HTTP request, to thereby produce a modified HTTP request, and sending the modified HTTP request to the server. The networking method may further utilize a user-defined ruleset having HTTP response rules, and may include receiving an HTTP response to the modified HTTP request from the server, applying the HTTP response rules to the HTTP response, to thereby produce a modified HTTP response, and sending the modified HTTP response to the client.

BRIEF DESCRIPTION OF THE DRAWINGS

FIG. 8 is a depiction of an example client HTTP request used in the networking system of FIG. 1.

FIG. 9 is a depiction of an example server HTTP response used in the networking system of FIG. 1.

FIG. 12 is a detail view of a portion of the first page of the reference guide of FIG. 10.

FIG. 13 is a detail view of a portion of the first page of the reference guide of FIG. 10.

FIG. 14 is a detail view of a portion of the first page of the reference guide of FIG. 10.

FIG. 15 is a detail view of a portion of the first page of the reference guide of FIG. 10.

FIG. 16 is a detail view of a portion of the first page of the reference guide of FIG. 10.

FIG. 17 is a detail view of a portion of the first page of the reference guide of FIG. 10.

FIG. 18 is a detail view of a portion of the first page of the reference guide of FIG. 10.

FIG. 19 is a detail view of a portion of the first page of the reference guide of FIG. 10.

FIG. 22 is a detail view of a portion of the second page of the reference guide of FIG. 1.

FIG. 23 is a detail view of a portion of the second page of the reference guide of FIG. 11.

FIG. 24 is a detail view of a portion of the second page of the reference guide of FIG. 11.

DETAILED DESCRIPTION OF THE PREFERRED EMBODIMENT

Figure 1:
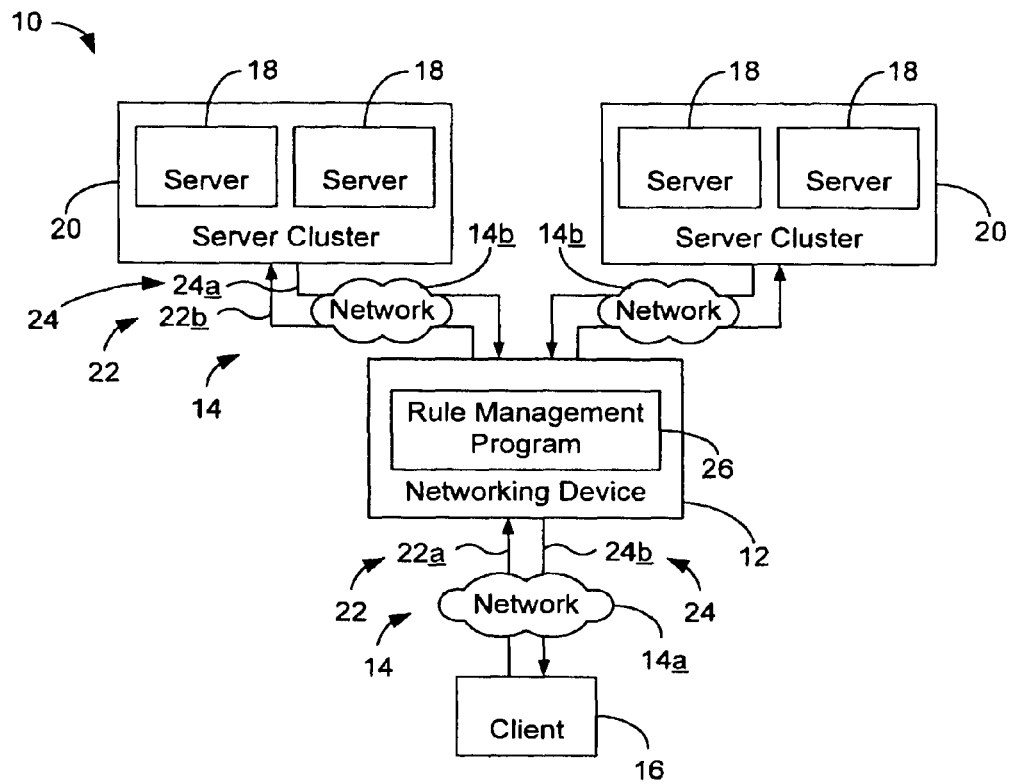
FIG. 1 is a schematic view of a networking system according to one embodiment of the present invention.

Referring to FIG. 1, a rule-based networking system is shown generally at 10. System 10 typically includes a networking device 12 positioned on a computer network 14 intermediate a client 16 and one or more servers 18, which may be grouped into server clusters 20. Typically, client 16 and networking device 12 are linked by a wide area network 14a such as the Internet, while networking device 12 and servers 18 are linked by a local area network 14b.

Suitable networking devices that may be used in accordance with the present invention are described in the following copending U.S. patent applications, the disclosure of each of which is incorporated by reference for all purposes: U.S. patent application Ser. No. 09/680,675 entitled, NETWORK DATA TRANSFER ACCELERATION SYSTEM AND METHOD, filed Oct. 6, 2000; U.S. patent application Ser. No. 09/680,977 entitled, IMAGE AND TRANSFER SYSTEM AND METHOD, filed Oct. 6, 2000; U.S. patent application Ser. No. 09/680,998 entitled, WEB PAGE SOURCE FILE TRANSFER SYSTEM AND METHOD, filed Oct. 6, 2000; U.S. patent application Ser. No. 09/975,522 entitled, HTTP MULTIPLEXOR/DEMULTIPLEXOR, filed Oct. 10, 2001; U.S. patent application Ser. No. 10/136,030 entitled, HTTP MLTIPLEXOR/DEMULTIPLEXOR SYSTEM FOR USE IN SECURE TRANSACTIONS, filed Apr. 29, 2002; and U.S. patent application Ser. No. 10/222,051 entitled, SYSTEM AND METHOD FOR MAINTAINING STATEFULNESS DURING CLIENT-SERVER INTERACTIONS, filed Aug. 16, 2002.

Networking device 12 is configured to receive a client request 22 from the client. The client request is processed at the networking device and the processed request is forwarded to a server. Prior to processing by the networking device, request 22 is referred to as a pre-processed request 22a, and after processing request 22 is referred to as processed request 22b. Because the networking device often modifies the request, pre-processed request 22a may also be referred to as an original request 22a, and processed request 22b may be referred to as a modified request 22b.

The server responds to the processed request by sending a response 24 to the networking device. The networking device processes the response, and the processed response is forwarded to the client. Prior to processing by the networking device, response 24 is referred to as a pre-processed response 24a, and after processing, response 24 is referred to as processed response 24b. Because the networking device often modifies the response, pre-processed response 24a may also be referred to as an original response 24a, and processed response 24b may be referred to as a modified response 24b.

The processing of requests 22 and responses 24 at the networking device takes place according to a set of user-specified rules, which are applied by a rule management program 26 executed on the networking device. It will be appreciated that the each of the rules may be applied in a server-specific a server-cluster-specific manner, if desired.

The format of HTTP requests and responses is well known in the art and is set forth in Request for Comments (RFC) 2616 Fielding, et al., June 1999, available at http://www.w3.org/Protocols/rfc2616/rfc2616.html, and explained in tutorials such as HTTP Pocket Reference, Clinton Wong, May 2000 (O'Rielly). The entire disclosures of each of these references are herein incorporated by reference for all purposes.

FIG. 8 illustrates an exemplary client HTTP request. The first line of the HTTP request typically includes the method (GET, POST, PUT, LINK, UNLINK, DELETE, OPTIONS, and TRACE), uniform resource indicator (typically a URL), and HTTP version for the request. This information is followed by a general header, which may appear in both client requests and server responses. General headers are used, for example, to transmit information about cache control, date, etc. The HTTP request may further include client request headers, which are used to inform the server of client capabilities such as the types of images, compression encoding, and languages that the client is configured to receive. The request may further include entity headers an entity body, which is primarily used to pass data from the client to the server, for example, when the client posts data to the server in response to a fillable form. Herein, the term "content" is alternatively used to refer to data stored in the entity body.

FIG. 9 illustrates an exemplary server HTTP response. The first line of a typical HTTP response includes the HTTP version, and a status code/reason for the response. In the depicted response status code/reason 200 OK indicates that the request has been fulfilled. Various other status codes exist, such as 404 Not Found and 403 Forbidden. These status codes are well defined and well known in the art. The response may further include a general header with time and date information. The response may further include response headers that include information about the response, such as content encoding, content language, cache control, host information, server information, expiration information, etc. The response also includes entity headers that include information (content type, content length, date last modified) about the content of the response, and an entity body, which contains the content itself, such as HTML text data.

Figure 2:
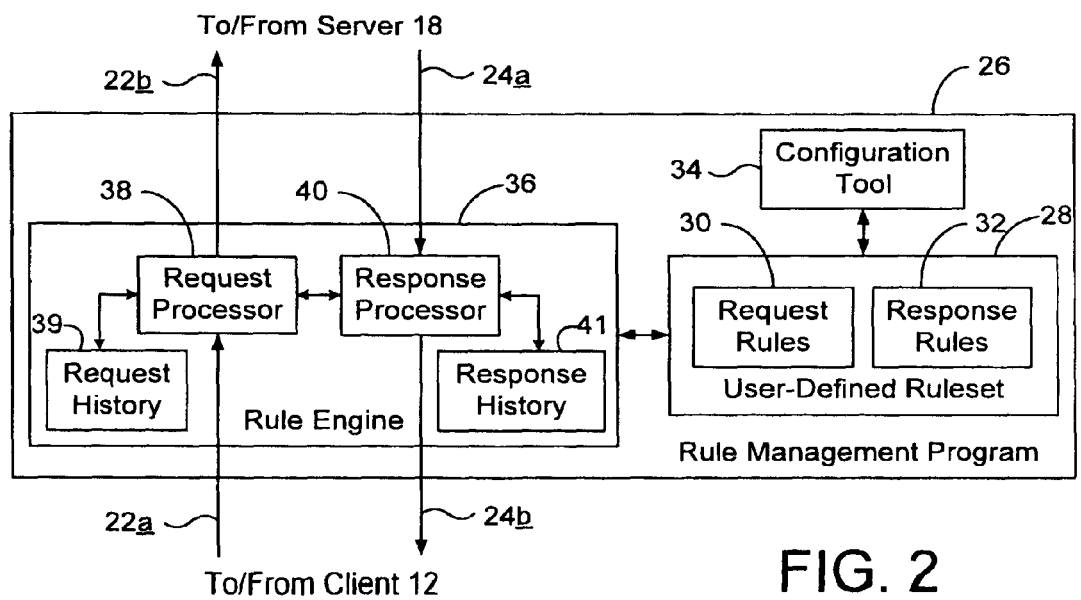
FIG. 2 is a schematic view of a rule management program executed by a networking device of the networking system of FIG. 1.

As shown in FIG. 2, the rule management program typically includes a user-defined ruleset 28, including request rules 30 and response rules 32. A configuration tool 34 is provided, by which the user may enter and modify the various rules in the user defined ruleset. Rule management program 26 further includes a rule engine 36 with a request processor 38 and a response processor 40, which are program modules respectively configured to process incoming requests and responses according to the rules in the user-defined ruleset 28. The pre-processed requests 22a is typically at least temporarily stored in a request history cache 39. If desired, post-processed request 22b may also be stored in the request history. The requests stored in request history cache 39 may be recalled by response processor 40, or request processor 38, in order to apply a response rule or request rule to a subsequent response or request. Likewise, preprocessed responses 24a are typically at least temporarily stored in a response history cache 41. If desired, post-processed responses 24b may also be stored in the response history cache 41. The responses stored in response history cache 40 may be recalled by request processor 38, or response processor 40, in order to apply a response rule or request rule to a subsequent request or response. In this manner, the user-defined ruleset may be used to alter a current request or response based on parameters in prior requests and responses.

Figure 3:
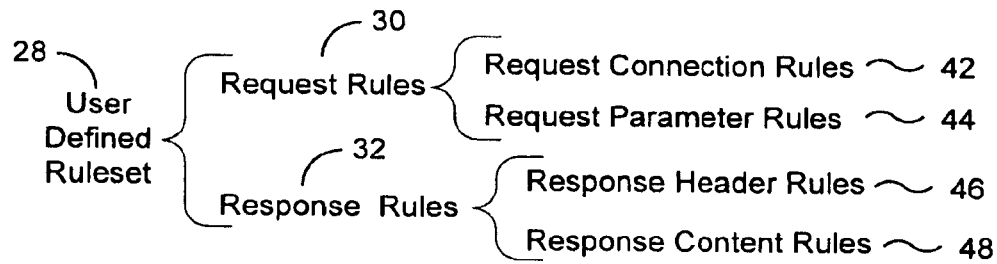
FIG. 3 is a diagram representing a hierarchy of rule types implemented by the networking system of FIG. 1.

As shown in FIG. 3, request rules 30 of user-defined ruleset 28 typically include request connection rules 42 and request parameter rules 44, while response rules 32 typically include response header rules 46 and response content rules 48.

The syntax for rules 42-48 typically is as follows:

Rule=Test Condition, [AND Test Condition], Action Statement [AND Action Statement]

The Test Condition in the above syntax is typically represented as follows:

Test Condition=Variable, Test Operator

Exemplary variables, test operators, and action statements are illustrated in the user reference guide shown in FIGS. 10-25.

Request connection rules 42 are rules that instruct the networking device to examine an aspect of an incoming request, and to take a predetermined action relating to the connection on which the request was sent, such as closing the connection, redirecting the request to another URL, responding that the requested resource could not be found on the server (404 Not Found), replying (200OK) with a desired object, or logging the request for subsequent analysis. For example, according to the following rule if the source IP address is from a prohibited domain, the networking device will close the connection without responding.

SRC_IP CONTAINS "63.45.67" THEN CLOSE_CONN

This type of rule may be used, for example, to prohibit access from domains that are known for producing malicious requests. The above example blocks based on layer 4 (TCP) information, using just the first three octets of a numeric IP address. The following type of rule may be used to examine a parameter in an incoming HTTP request and block requests based on the parameter. In the example, the request parameter is the absence of a user-agent header, since many robots do not include a user-agent header.

REQUEST_HEADER "USER-AGENT" NOT_EXISTS THEN CLOSE_CONN

Request parameter rules 44 instruct the networking device to examine an aspect of an incoming request, and take a predetermined action relating to the header for the request, such as inserting, replacing, appending, prepending, deleting, or otherwise modifying a request parameter such as a request header, the URL for the request, or a request query (post data). This can be useful in a range of scenarios. For example, some programs such as Norton™ Anti-Virus, modify the client browser so that it does not send "Accept-Encoding: gzip, deflate", but rather leaves a signature that indicates a change was made: "~~~~~_~~~~~~; ~~~, ~~~~~~". The following example request parameter rule updates a request header to accept GZIP and Deflate compression encoding, if the request header "Accept-Encoding" contains "~~~" and if the request header "User Agent" contains MSIE, which is typically true for requests sent by Internet Explorer® browsers modified by security programs such as Norton® Anti-Virus.

IF REQUEST_HEADER "ACCEPT-ENCODING" CONTAINS "~~~" AND REQUEST_HEADER "USER-AGENT" CONTAINS "MSIE" THEN UPDATE REQUEST_HEADER "ACCEPT-ENCODING" "GZIP, DEFLATE"

Response header rules 46 instruct the networking device to examine an aspect of an incoming response from a server 18, and take a predetermined action relating to a header of the response (including a general header, response header, or entity header), such as inserting, replacing, appending, prepending, deleting, or otherwise modifying a portion of the response header. The following example response header rule inserts a header into the response that indicates the response has been processed by a Redline Networks® networking device.

INSERT_REPLY_HEADER "X-POWERED-BY" "REDLINE"

It will be appreciated that the above statement may be combined with other test conditions such that the action is taken only for certain objects, or only for certain users, as shown in the following example.

REQUEST_HEADER "USER-AGENT" CONTAINS "MSIE" AND SOURCE_IP STARTS_WITH "10.10" THEN INSERT_REPLY_HEADER "X-POWERED-BY" "REDLINE"

Response content rules 48 instruct the networking device to examine the content of the response, which is stored in the entity body field described above, and take a predetermined action. Typically, the predetermined action is modifying the content of the response by prepending, appending, or replacing a portion of the content.

For example, according to the following rule, if the response content includes the term *.jpg then the header will be replaced with *small.jpg, where "*" is a wildcard representing a string of one or more characters.

CONTENT CONTAINS "*.jpg" THEN REPLACE "*small.jpg"

This type of rule may be used, for example, to rewrite a hyperlink in an HTML page that points to an image, thereby causing the client to request a smaller version of the image.

It will be appreciated that the response content may be rewritten in a variety of other ways. For example, as described in Example 1, below, the content may be rewritten to change links from HTTP:// to HTTPS://. As explained in detail below, in addition to rewriting the HTML from HTTP://" TO "HTTPS://", the networking device may also be configured to rewrite cookie values, the referral header, and the host header, on the outbound responses sent to the client, and "undo" these changes prior to passing a subsequent inbound request from the client to the server. Other examples include rewriting https:// links to enforce the use of SSL, and rewriting all of the html links to different URI namespace that is customized (tokenized) for each unique client user. For example, the URL "/LOGIN.JSP" could be encrypted to "/398087SKIDHXK," or other unique user-identifying string. With this latter functionality employed, web crawling robots and individuals are inhibited from guessing a namespace to attack.

Suitable methods for adding parameters to URLs, etc., for the purposes of identifying unique users during HTTP sessions are described in co-pending U.S. application Ser. No. 10/222,051, filed Aug. 16, 2002, entitled SYSTEM AND METHOD FOR MAINTAINING STATEFULNESS DURING CLIENT-SERVER INTERACTIONS, the entire content of which is herein incorporated by reference. For example, a portion of a URL such as "/GET_QUOTE.ASPXP" may be tokenized by rewriting it to "GET_QUOTE.ASPX?USER=12422," wherein USER=12422 is the token identifying the user. It will be appreciated that the token could be encrypted. In addition to identifying the user, the token may also identify the target server which is holding the users session. In this way, if a client engages a server in a transaction for which the user identity and server need to be tracked, such as adding an item to a shopping cart, etc., the networking device can rewrite the URL itself to keep track of the user and server session. This may obviate the need to place a cookie on the client device to maintain statefulness, which enables statefulness to be maintained even for client devices that do not accept cookies, such as many web-enabled telephones.

As these various examples demonstrate, the rule-based system described herein is able to modify, enhance, and alter the output and behavior of a server-based application from the point of view of the client, without changing or reprogramming the application itself, to increase performance or security, or add functionality.

Figure 4:
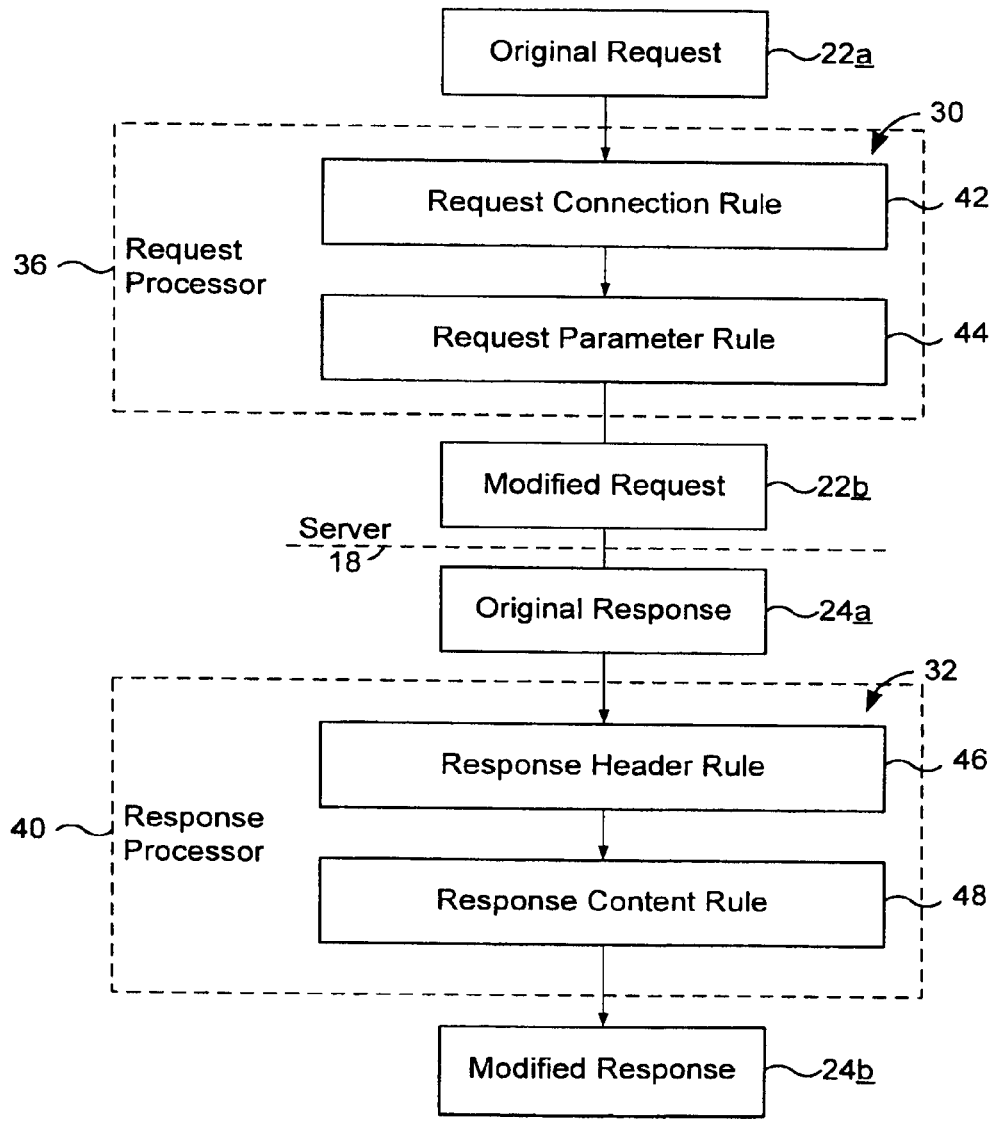
FIG. 4 is a schematic diagram illustrating an order of execution of rules in the networking system of FIG. 1.

FIG. 4 illustrates an execution order for rules 42-48 of user-defined ruleset 28. Request processor 36 first executes request connection rules 42 and then request parameter rules 44, prior to sending the processed request to server 18. Upon receiving a response to the request, response processor 40 next executes response header rules 46, and then response content rules 48, and modifies the response to form a modified response 24b, which is sent to the client 16. Of course, it will be appreciated that the original request or original response might not satisfy any user-defined rules. For these request-response communications, only the request may be modified, only the response may be modified, or neither may be modified, according to the user-defined ruleset.

Figure 5:
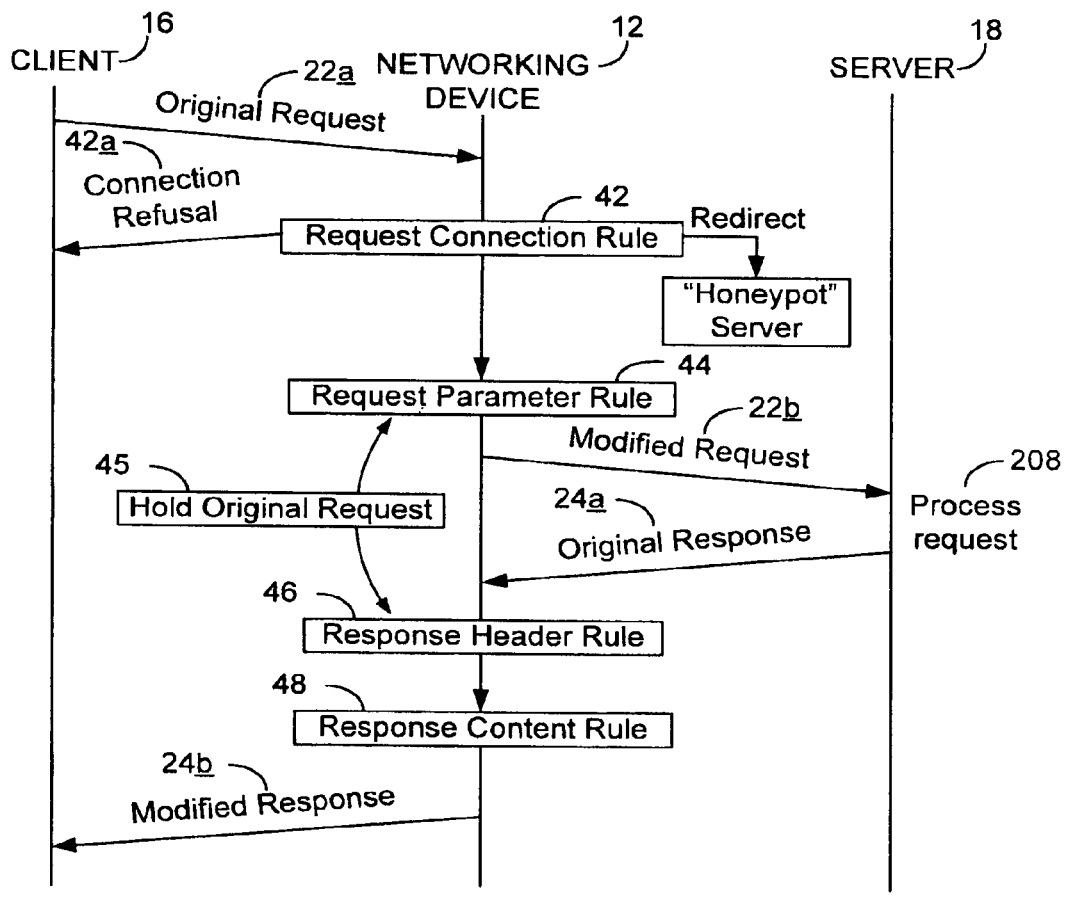
FIG. 5 is a schematic diagram illustrating messages sent between a client, networking device, and server of the networking system of FIG. 1.

FIG. 5 illustrates a method of interaction between client 16, networking device 12, and server 18, according to one embodiment of the present invention. The method includes sending a client HTTP request 22a from client 16 to networking device 12. Networking device 12 first applies one or more request connection rules 42 to the request. The request connection rule may be programmed by a user to specify that a request meeting a certain test condition is refused (as shown as "Connection Refusal 42a" in the example of FIG. 5), redirected (as shown "Redirect" in the example of FIG. 5), or replied to as not found. The request may also be logged. The connection redirect illustrated at 42b redirects the request to a "honeypot" server. A honeypot server is a device placed on the network that is designed to provide administrators tracking data and forensic analysis for use in detecting attacks and malicious users. Alternatively, the request may be redirected to another location.

If the request is not refused or redirected, networking device 12 applies one or more request parameter rules 44 to the incoming request 22a, and may modify a parameter of the incoming request according to request parameter rules 44, to thereby produce modified request 22b. The parameter may be, for example, a URL, request header, query, cookie, or other parameter of the client request. It will be appreciated that the parameter of the request 22a may be modified by the networking device to change the target server to which the request is directed, or to change the path on the target server to which the request is directed. The modified request 22b is subsequently sent to an appropriate server 18.

Server 18 processes the modified request 22b, and sends a response 24a to the networking device 12. Networking device 12 in turn may apply one or more response header rules 46 to the response 24a, and may modify a header of the response accordingly. Networking device 12 may also apply one or more response content rules 48 to the response 24a, and modify the content (entity-body), of the response accordingly, to thereby produce a modified response 24b. The modified response 24b is sent from the networking device 12 to the requesting client 16.

The following examples provide further illustration of specific scenarios in which the above described system and method may be employed.

EXAMPLE 1

Five Rules for Rewriting HTTP to HTTPS

Figure 6:
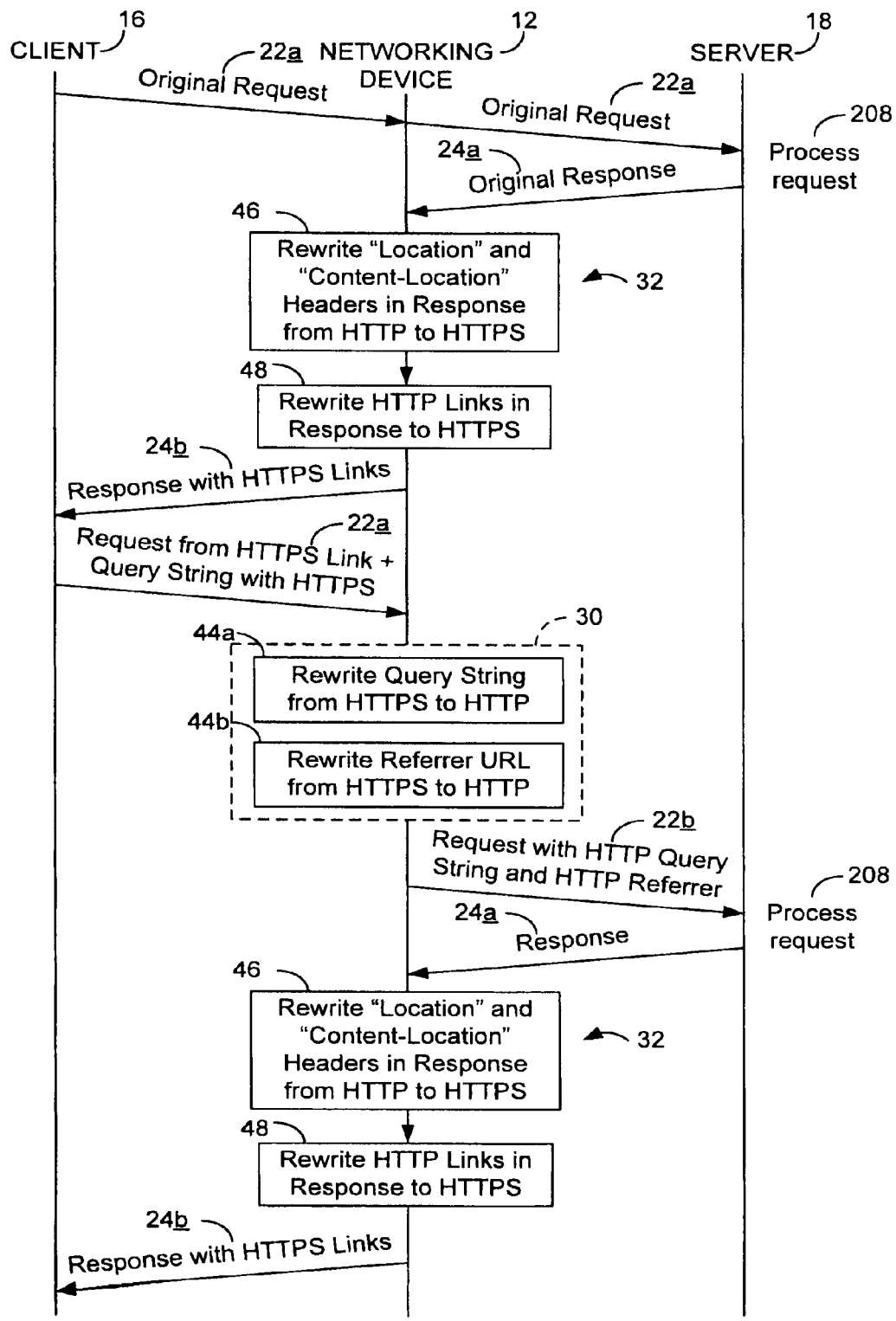
FIG. 6 is a schematic diagram illustrating messages sent between a client, networking device, and server of the networking system of FIG. 1, when programmed with rules for ensuring HTTPS protocols are used.

FIG. 6 illustrates the application of the rule-based system described herein to rewrite HTTP links to HTTPS links. HTTPS is a transfer protocol that sends data via the HTTP protocol, using industry standard Secure Socket Layer (SSL) encoding, to prevent unauthorized access by third parties to the data stream during transmission. The following five rules may be used to achieve the functionality shown in FIG. 6.

The first rule, reproduced below, rewrites HTML/JS/CSS content links from HTTP to HTTPS.

1. RESPONSE CONTENT RULE: CONTENT CONTAINS "HTTP://WWW.COMPANY.COM" THEN REPLACE CONTENT TERM HTTPS://WWW.COMPANY.COM (OPTIONAL: AND CONTINUE)

Use of the above rule alone might result in query strings being returned to the server from the client as HTTPS rather than HTTP. This may cause some servers to report an error or perform unpredictably. Therefore, the second rule, reproduced below, may be used to change the query strings back to HTTP before sending the request to the server.

2. REQUEST PARAMETER RULE: QUERY_STRING CONTAINS "HTTPS://WWW.COMPANY.COM/" THEN REPLACE QUERY_STRING TERM HTTP://WWW.COMPANY.COM/AND (OPTIONAL: AND CONTINUE)

Further, some server applications also insist that the "referrer," indicated in the request header and the query string are consistent. The third rule, reproduced below, may be used to ensure that that this is the case.

3. REQUEST PARAMETER RULE: REQUEST_HEADER "REFERRER" STARTS_WITH "HTTPS://WWW" AND QUERY_STRING STARTS_WITH "URL=HTTPS://WWW.COMPANY.COM/" THEN REPLACE REQUEST_HEADER "REFERRER" TERM "HTTP://WWW" AND REPLACE QUERY_STRING TERM "URL=HTTP://WWW.COMPANY.COM:8080/" (OPTIONAL: AND CONTINUE)

Finally, the server may redirect a request using the original HTTP protocol, rather than the HTTPS protocol. Therefore, the fourth and fifth rules, reproduced below, may be used to rewrite two different response headers to ensure that redirects are sent via the HTTPS protocol.

4. RESPONSE HEADER RULE: REPLY_HEADER "CONTENT-LOCATION" CONTAINS "HTTP://WWW.COMPANY.COM" THEN REPLACE REPLY_HEADER "CONTENT-LOCATION" TERM HTTPS://WWW.COMPANY.COM (OPTIONAL: AND CONTINUE)

5. RESPONSE HEADER RULE: REPLY_HEADER "LOCATION" CONTAINS "HTTP://WWW.COMPANY.COM" THEN REPLACE REPLY_HEADER "LOCATION" TERM HTTPS://WWW.COMPANY.COM (OPTIONAL: AND CONTINUE)

The flow diagram in FIG. 6 illustrates one exemplary implementation of the five rules described above. An original request 22a is sent from client 16 to networking device 12, and is forwarded to server 18, typically without change. The request is processed at the server and an original response is sent, using the HTTP protocol, from the server to the networking device 12.

According to the response header rules 46 listed as rules four and five above, networking device 12 rewrites the location and content-location headers in the response, from "HTTP" to "HTTPS." According to the response content rule 48 listed as rule one above, the networking device rewrites the HTTP links in the content of the response to HTTPS links. The modified response 24b is sent is sent from networking device 12 to client 16, and typically is displayed as a web page on the client device.

Requests originating from the HTTPS links in the displayed web page will cause an original HTTPS request 22a to be sent to the networking device from the client. At the networking device, request parameter rules 44a and 44b, listed above as rules two and three, will cause any query string to be rewritten from HTTPS to HTTP, and to rewrite the referrer URL from HTTPS to HTTP. With these changes made, the modified request 22b is sent from the networking device to the server. The server in turn processes the request and sends a response back to the networking device. The networking device rewrites the location and content-location headers, and rewrites the HTTP links to HTTPS, in the manner described above, before the response is sent to the client.

Utilizing this rule based system, an administrator may switch an application on a server from using HTTP to using HTTPS, simply by deploying an intermediate networking device 12 with the above configured rules, thereby avoiding complicated re-programming of the application itself.

EXAMPLE 2

Force Allowed Directory Structure for Increased Security

To prevent unwanted access to a server from web crawling robots, viruses and worms, the following ruleset may be deployed. Robots, viruses and worms typically do not request URLs located in "allowed" namespace. Thus, administrators may inhibit unwanted access by rewriting links to an allowed namespace. An example for use with relative links follows. Absolute links require more rules.

1. REQUEST CONNECTION RULE: URL NOT_EQUALS "/ROBOTS.TXT" AND URL NOT_STARTS_WITH "/ALLOWED-DIRECTORY/" THEN REPLY 302 "HTTP://WWW.REDLINENETWORKS.COM" "/ALLOWED-DIRECTORY/"

2. RESPONSE CONTENT RULE: CONTENT CI_CONTAINS "HREF=\"/" THEN APPEND CONTENT TERM "ALLOWED-DIRECTORY/"

3. RESPONSE CONTENT RULE: CONTENT CI_CONTAINS "SRC=\"/" THEN APPEND CONTENT TERM "ALLOWED-DIRECTORY/"

4. REQUEST PARAMETER RULE: URL STARTS_WITH "/ALLOWED-DIRECTORY/" THEN REPLACE URL TERM "/"

The effect of implementing the above rules is that the networking device can be assured that a legitimate client accessing the application on the server will always send requests that start with "/allowed-directory/". Rule 1 above causes any request for "http://www.redlinenetworks.com/" to be redirected to http://www.redlinenetworks.com/allowed-directory/. Requests for robots.txt, which is a standardized file that "friendly" robots request to obtain rules for how to access a particular website, are allowed without modification. Rules 2 and 3 append the term "/allowed directory/" to URL links and image sources, thus ensuring that all the URLs for any link or image will include the "/allowed directory/" term necessary to pass through networking device 12. If any request with /allowed directory/ was actually sent to the server, however, the server would return 404 Not Found, because it doesn't have such a directory. For this reason, Rule 4 rewrites the URL of responses to delete the term "/allowed directory/".

Figure 7:
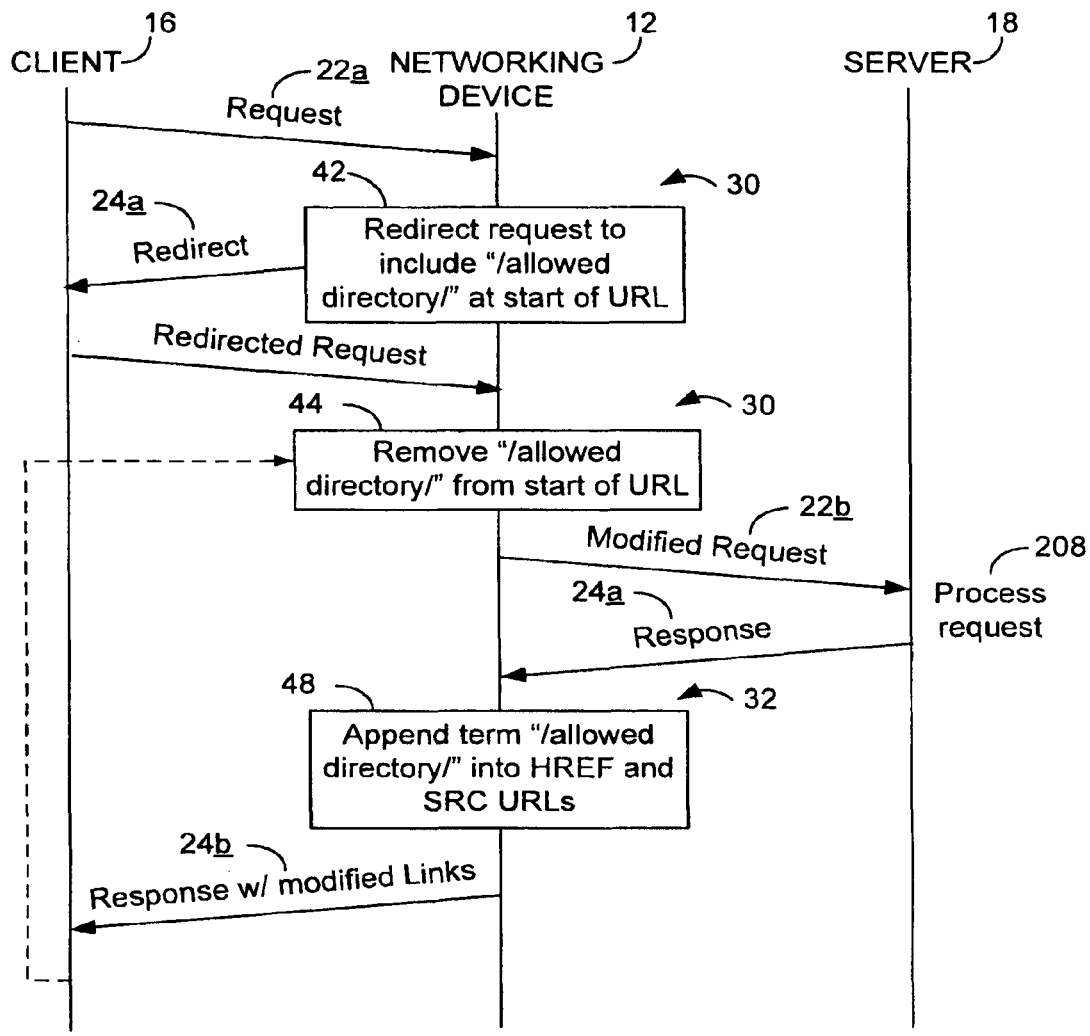
FIG. 7 is a schematic diagram illustrating messages sent between a client, networking device, and server of the networking system of FIG. 1, when programmed with rules for bi-directional namespace change to inhibit undesirable access by malicious viruses, robots, and worms.

FIG. 7 illustrates the application of the rules. Initially, a client sends an original request 22a to networking device 12. Assuming the request is for "/", the networking device applies rule one above, and redirects the request to include "/allowed directory/" at the start of the URL. The redirected request is again sent from the client to the networking device, where rule 5 above is applied to delete references to "/allowed directory/", to thereby create a modified request 22b that the server can process.

The modified request 22b is sent to the server, where it is processed. A response 24a is sent from the server to the networking device. At the networking device, applying rules three and four above, the URLs for HREF and SRC tags in the response are appended to include "/allowed directory/", to thereby form a modified response 24b. The modified 24b is sent to the client. Requests originating from the modified response 24b are sent back to the networking device, where the text "/allowed directory/" is removed from the URL of the request, as shown at the dashed line in the FIG. 7, and the process repeats.

Thus, a method may be practiced according to one embodiment of the present invention including receiving a original HTTP request at the networking device, the original HTTP request being directed to a URL in a first namespace located on the server. The method may further include instructing the client to redirect the HTTP request to a URL in a second namespace. The method may further include receiving a redirected HTTP request at the networking device, translating the redirected HTTP request back into the first namespace, to form a translated HTTP request, and sending the translated HTTP request directed to the first namespace to the server. The method may further include receiving an original HTTP response to the HTTP request, the response including a link to a URL in the first namespace, modifying a link within the original HTTP response such that the link points to the second namespace, thereby forming a modified response, and forwarding the modified response to the client. The method may also include receiving a subsequent request from the client, the request originating from the modified link in the modified response, the subsequent request being directed to the second namespace, translating the subsequent HTTP request back into the first namespace, to form a translated subsequent HTTP request, and forwarding the translated subsequent HTTP request to the server.

According to another embodiment of the present invention a method may be practiced, including receiving an HTTP request from the client, at the networking device, translating the HTTP request from a first namespace to a second namespace, forwarding the translated HTTP request to the server, receiving an HTTP response to the HTTP request at the networking device, translating the HTTP response from the second namespace back to the first namespace, and forwarding the translated HTTP response to the client. Typically, the first namespace is not known by the server, and the second namespace is not known by the client.

EXAMPLE 3

Insert P3P Header

P3P is a well-defined standard by which a website may communicate its privacy policy to a requesting client, using standardized compact policy codes that are embedded in HTTP responses sent to the client. The client browser may compare the compact policy for a website to a user-specified privacy policy on the client device, and take a suitable course of action, such as warning the user that a cookie is about to be set on the user's machine. Heretofore, adding P3P headers to a website typically involved hard coding the headers into HTML pages, or complicated programming to generate the headers dynamically using a language such as perl, asp, etc. The following rule enables networking device 12 to add response headers including P3P compact policy codes to HTTP responses sent from server 18 to client 16, without changing the application on the server.

RESPONSE HEADER RULE: URL STARTS_WITH "/" THEN INSERT_REPLY_HEADER "P3P" "\" CP=HAO KTP HOT KEM HNT TTA PRE\" "

EXAMPLE 4

Modify Redirects in Siebel® Web App

The following rules may be used to modify redirects in Siebel® web applications.
RESPONSE HEADER RULE: REPLY_HEADER "CONTENT-LOCATION" CONTAINS "HTTP://SIEBWEB.COMP.COM" THEN REPLACE REPLY_HEADER "CONTENT-LOCATION" TERM HTTP://SIEBWEB2.COMP.COM"
RESPONSE HEADER RULE: REPLY_HEADER "LOCATION" CONTAINS "SIEBELWEB." THEN REPLACE REPLY_HEADER "LOCATION" TERM "SIEBELWEB2."

EXAMPLE 5

PS OneWorld XE on AS400 (Named Merlin)

The following rules may be used in connection with the People Soft® web application OneWorld XE running on IBM® AS400 servers. The query string should match the AS400 machine name, not the name of the instance.
REQUEST PARAMETER RULE: URL STARTS_WITH "/" AND REQUEST_HEADER "HOST" CI_EQ "ONEWORLD.COMPANY.COM" AND QUERY_STRING CONTAINS "MERLIN" THEN UPDATE_REQUEST_HEADER "HOST" "MERLIN" AND REPLACE QUERY_STRING TERM "ONEWORLD"
REQUEST PARAMETER RULE: URL STARTS_WITH "/" AND REQUEST_HEADER "HOST" CI_EQ "ONEWORLD.COMPANY.COM" AND QUERY_STRING CONTAINS "ONEWORLD" THEN UPDATE_REQUEST_HEADER "HOST" "MERLIN" AND REPLACE QUERY_STRING TERM "MERLIN"
REQUEST PARAMETER RULE: URL STARTS_WITH "/" AND REQUEST_HEADER "HOST" CI_EQ "ONEWORLDPROD.COMPANY.COM" AND QUERY_STRING CONTAINS "ONEWORLD" THEN UPDATE_REQUEST_HEADER "HOST" "MERLINPROD" AND REPLACE QUERY_STRING TERM "MERLIN"
RESPONSE CONTENT RULE: CONTENT CI_CONTAINS "MERLIN:81" THEN REPLACE CONTENT TERM "ONEWORLD:81"
RESPONSE CONTENT RULE: CONTENT CI_CONTAINS "MERLIN:81.COMPANY.COM" THEN REPLACE CONTENT TERM "ONEWORLD.COMPANY.COM:81"

EXAMPLE 6

Routing Rules

The following are examples of flexible layer 7 request routing rules.
REQUEST PARAMETER RULE: URL STARTS_WITH "/IMAGES" THEN ROUTE_REQUEST TARGET_HOST "192.168.0.2:80" "201.201.0.2:80" "198.168.6.2:80"
REQUEST PARAMETER RULE: URL CONTAINS ".ASPX" THEN ROUTE_REQUEST TARGET_HOST "10.0.0.3" 10.0.0.4"
REQUEST PARAMETER RULE: URL CONTAINS "/CGI-BIN" AND HTTP_METHOD EQ "1.1" AND REQUEST_HEADER "USER-AGENT" CONTAINS "MSIE 6.0" AND SOURCE_IP STARTS_WITH "216.100.224" AND REQUEST_COOKIE "DEALDETECTOR" EQUALS "TRUE" AND QUERY_STRING ENDS_WITH "088" AND REQUEST_HEADER "ACCEPT-LANGUAGE" NOT_CONTAINS "FR" THEN ROUTE_REQUEST "192.168.0.15" "192.168.0.16" "192.168.0.17" "192.168.0.18"

EXAMPLE 7

Adding and Working with a Cache

The following are examples of commands that may be used to program networking device 12 to recognize a new cache for use with a server cluster.
ADD CACHE [CACHE_NAME]
SET CACHE <CACHE_NAME> MAX_OBJECTS <1-65,535>
SET CACHE <CACHE_NAME> SIZE <1,048,576-104,856,000 BYTES>
SET CLUSTER <CLUSTER_NAME> CACHE <CACHE_NAME>
SET CLUSTER <CLUSTER_NAME> CACHE <CACHE_NAME> ENABLED
SET CLUSTER <CLUSTER_NAME> APPRULE RULESET <RULESET_FILENAME>
SET CLUSTER <CLUSTER_NAME> APPRULE ENABLED EXAMPLE Cache Rules The following are examples of rules for networking device 12 that may be used to control behavior of the networking device relative to the cache. The following rules instruct the networking device to cache all images for 1 week, and cache all CSS and JS files for 1 day.
RESPONSE HEADER RULE: HTTP_REPLY_CODE EQUALS "200" AND REPLY_HEADER "CONTENT-TYPE" CONTAINS "IMAGE" THEN CACHE "86400"
RESPONSE HEADER RULE: HTTP_REPLY_CODE EQUALS "200" AND REPLY_HEADER "CONTENT-TYPE" CONTAINS "JAVASCRIPT" THEN CACHE "604800"
RESPONSE HEADER RULE: HTTP_REPLY_CODE EQUALS "200" AND REPLY_HEADER "CONTENT-TYPE" CONTAINS "CSS" THEN CACHE "604800"

EXAMPLE 8

Basic Security Rules

Examples of rules that may be used to implement security measures on networking device 12 are listed below. The following rule limits URL length to 8 kilobytes.
REQUEST CONNECTION RULE: URL LENGTH_GREATER_THAN "4096" THEN CLOSE_CONN FIN AND LOG
The following rule automatically limits headers, including cookies, to 8 kilobytes.
REQUEST CONNECTION RULE: ANY_REQUEST_HEADER LENGTH_GREATER_THAN "2048" THEN CLOSE_CONN RST
The following rule redirects SSL version three requests to a different server. It will be appreciated that the rule engine on also supports the test operators eq, ! eq, contains, ! contains, ends with, ! ends with, starts with, and ! starts with.

REQUEST CONNECTION RULE: SSL_VERSION EQ "SSLV3" THEN REDIRECT HTTPS://WWW.NEWSITE.COM "LOGIN.CGI"

The following rule redirect requests with SSL ciphers that are not 128 bits in length. Test operators such as less_than and greater_than may alternatively be used.

REQUEST CONNECTION RULE: SSL_CIPHER_BITS NOT_EQ "128" THEN REDIRECT HTTPS://WWW.NEWSITE.COM "LOGIN.CGI"

The following rule ensures that users have existing user sessions, or are redirected to a login page.

REQUEST CONNECTION RULE: REQUEST_COOKIE "SESSION_ID" NOT_EXISTS THEN REDIRECT HTTPS://WWW.MYSERVER.COM "/LOGIN.CGI"

The following rule examines to determine whether the requested URL include ".exe", and if so, closes the connection and logs the request.

REQUEST CONNECTION RULE: URL CONTAINS ".EXE" THEN CLOSE_CONN FIN AND LOG

The following rule inspects the URL for the suspicious string "%255", and routes the request to a honeypot server if the string is present.

REQUEST CONNECTION RULE: URL CONTAINS "%255" THEN ROUTE_REQUEST "10.0.0.5"

Since viruses often use IP addresses instead of host names in request headers, whereas hosts supplied by legitimate clients generally contain the host name, the following rule searches to determine whether the request header includes the host name, and if not, directs the redirects the request.

REQUEST CONNECTION RULE: REQUEST_HEADER "HOST" NOT_CONTAINS "MYSITE.COM" THEN REPLY 302 "HTTP://WWW.MYSITE.COM" "/"

The following rule may be used to "cloak" the server, by replacing the server header in the response with a desirable string.

RESPONSE HEADER RULE: URL STARTS_WITH "/" THEN UPDATE_REPLY_HEADER "SERVER" "APACHE 2.0.47 (AMIGA)" "NETSCAPE-ENTERPRISE/4.1" "GWS/2.1"

EXAMPLE 9

Basic Flexibility Rules

The following example shows how to use a response content rule as a special tag replacement mechanism. Wherever the special tag <%AddBanner%> is found, it is replaced with an HTML snippet that displays a banner ad.

RESPONSE CONTENT RULE: CONTENT CONTAINS "<%ADDBANNER%>" THEN REPLACE CONTENT TERM "<DIV ALIGN=CENTER> <A HREF=HTTP://WWW.DOUBLECLICK.NET/ADSYS.CGI?REDIR=HTTP://WWW.DELL.COM$ADSRC=WWW.MYSITE.COM> <IMG SRC=HTTP://AD SERV.DOUBLECLICK.NET/DEFAULT_LEADER.GIF ALT=\" CLICK HERE! "BORDER=0 WIDTH=728 HEIGHT=90> </A> </DIV>"

The following rule may be used to automatically update copyright notices on a website, without rewriting any static web pages or reprogramming an application that generates pages dynamically.

RESPONSE CONTENT RULE: REPLY_HEADER "CONTENT-TYPE" CONTAINS "TEXT" AND CONTENT CONTAINS "COPYRIGHT 2003" THEN UPDATE TERM "COPYRIGHT 2004"

EXAMPLE 10

Basic High-Availability Rules

The following rule may be used to determine whether an http request has failed with a reply code of 5xx, and if so, retry the request to the same target host in the cluster where the earlier attempt failed up to three more times. The results are logged.

RESPONSE HEADER RULE: HTTP_REPLY_CODE STARTS WITH "5" THEN RETRY_REQUEST SAME "3" AND LOG

According to the following rule, the case-insensitive (CI) match of the response content for the word "SQL ERROR" triggers a retry to the next target host in the cluster where the earlier attempt failed.

RESPONSE CONTENT RULE: CONTENT CI_CONTAINS "SQL ERROR" THEN RETRY_REQUEST "2" TIMES ALL AND LOG

It will be appreciated that rules may also be implemented that, upon detection of the test condition that a request has failed, instruct the networking device to take the predetermined action of retrying the request to the same server, retrying the request to a different server, retrying the request to a predefined list of servers in sequential order, for a specified number of retry attempts for each server.

Figure 10:
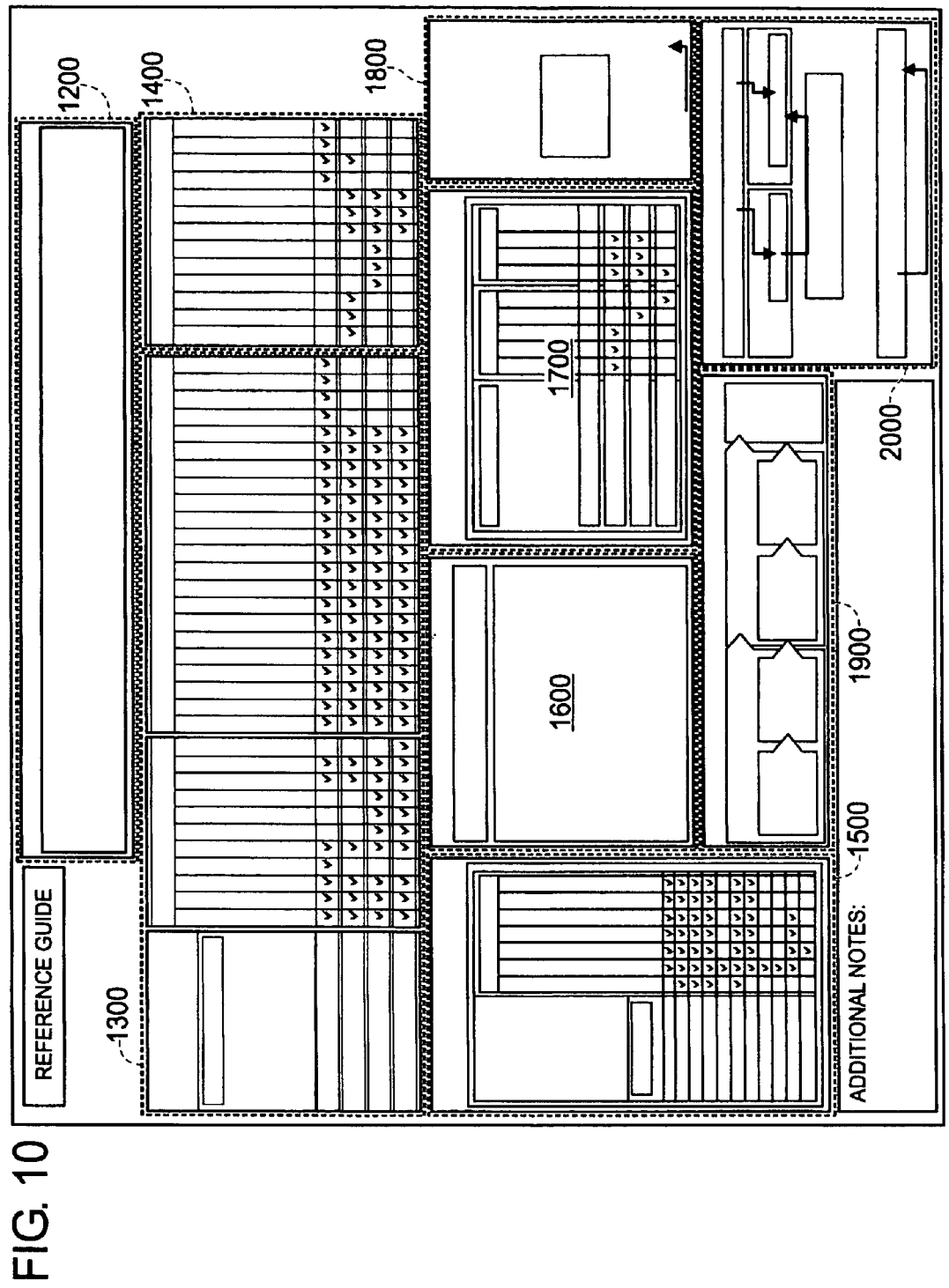
FIG. 10 is a first page of a reference guide for users of the networking system of FIG. 1.
Figure 11:
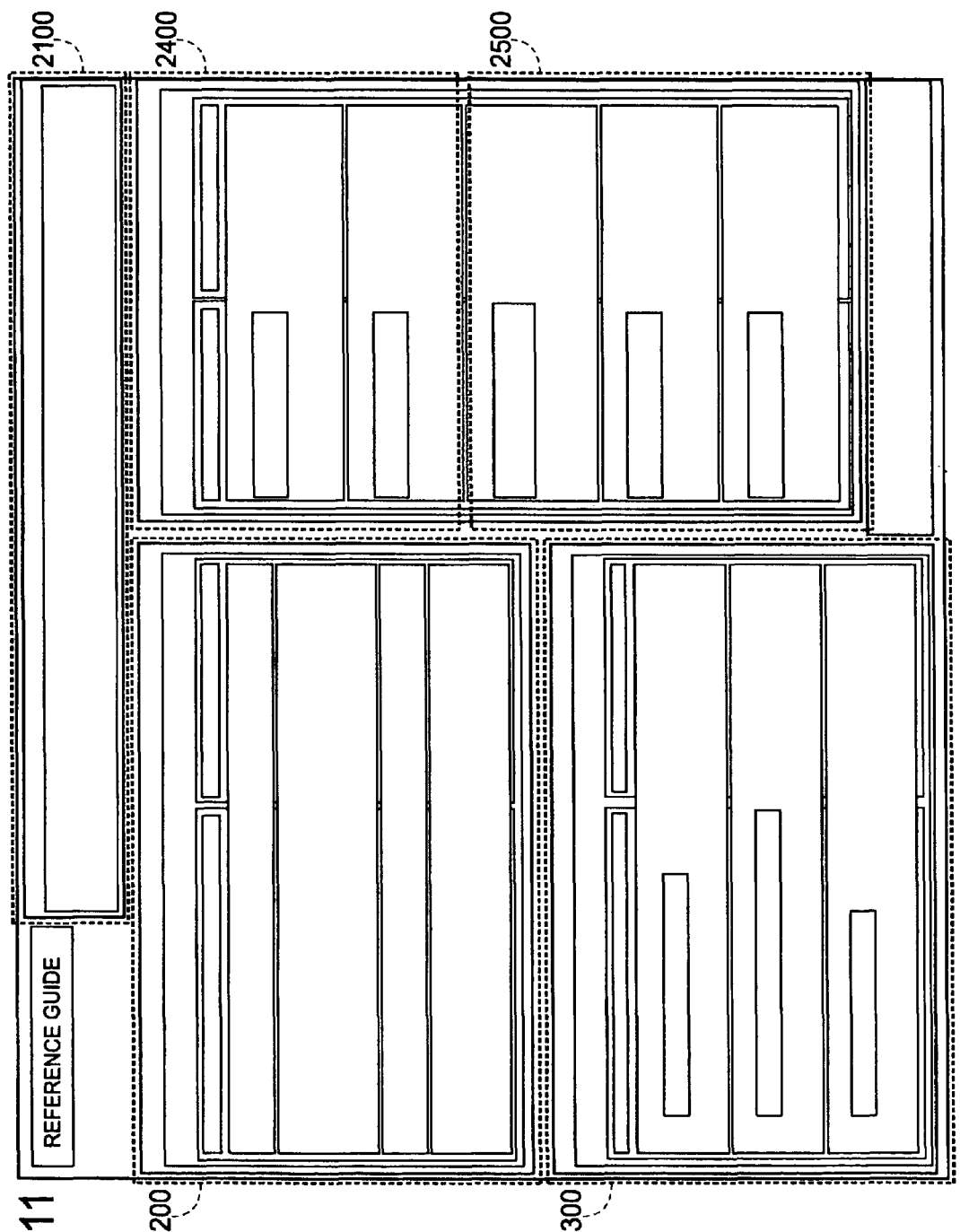
FIG. 11 is a second page of a reference guide for users of the networking system of FIG. 1.
Figure 20:
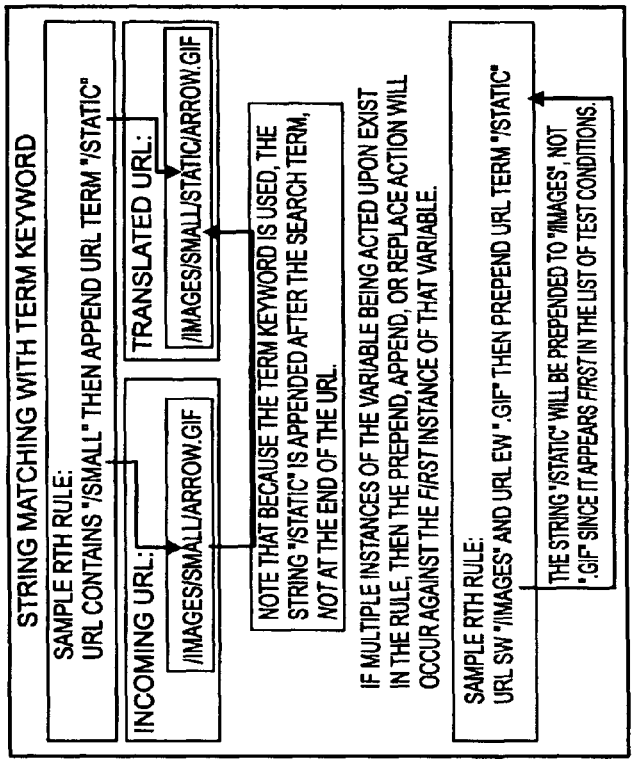
FIG. 20 is a detail view of a portion of the first page of the reference guide of FIG. 10.
Figure 21:
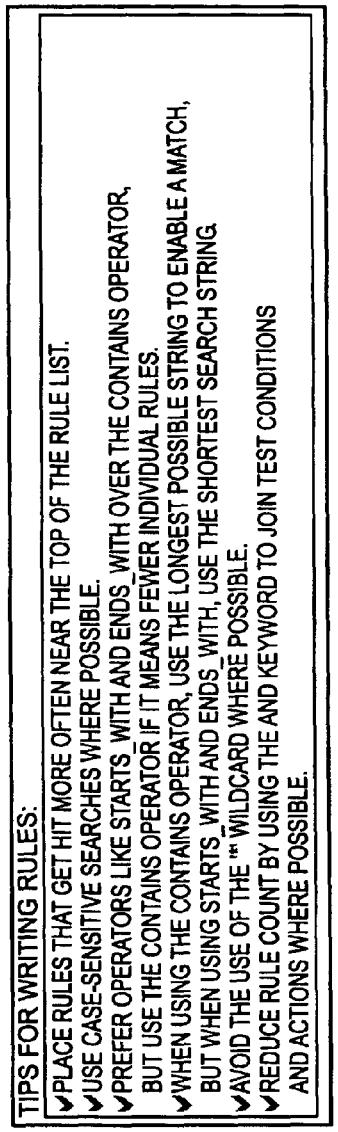
FIG. 21 is a detail view of a portion of the second page of the reference guide of FIG. 11.
Figure 25:
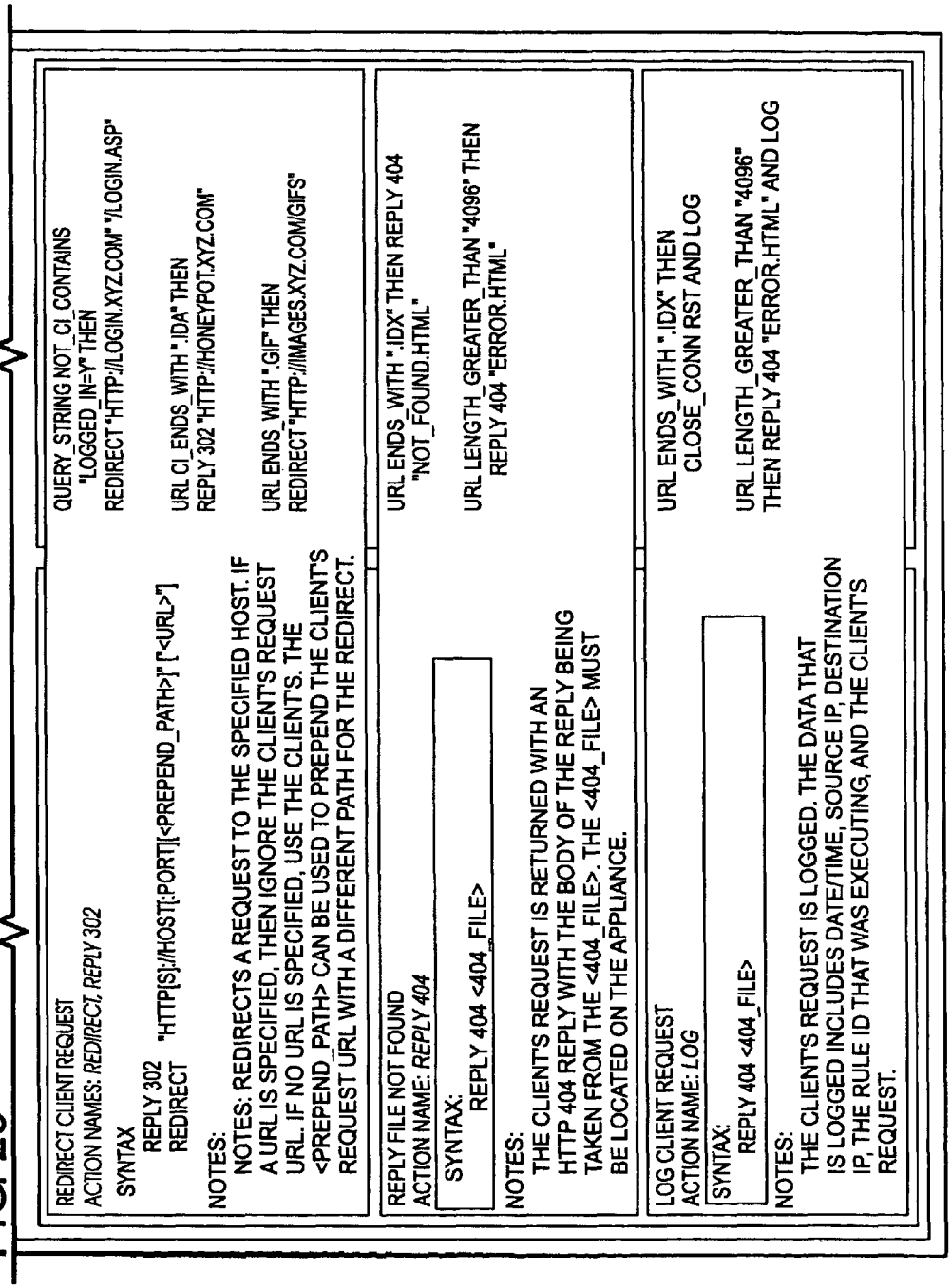
FIG. 25 is a detail view of a portion of the second page of the reference guide of FIG. 11.

FIGS. 10-25 illustrate a user reference guide for the networking device 12. The reference guide lists exemplary request connection rules ("Request Sentry RS"), request parameter rules ("Request Translator Header RTH"), response header rules ("Page Translator Header PTH"), and response content rules ("Page Translator Content PTC"). Although different names are used for these rules in the user reference guide for convenience of the user, it will be understood that the concepts and functionality of the rules described in the user reference guide are as described herein. FIGS. 10 and 11 illustrate two separate pages of the guide, which include guide sections 1200-2500. Each of guide sections 1200-2500 is reproduced in detail in one of FIGS. 12-25.

Although the present invention has been shown and described with reference to the foregoing operational principles and preferred embodiments, it will be apparent to those skilled in the art that various changes in form and detail may be made without departing from the spirit and scope of the invention. The present invention is intended to embrace all such alternatives, modifications and variances that fall within the scope of the appended claims.

The invention claimed is:

1. A networking device positioned intermediate to a client and server on a computer network, the networking device comprising:
a user-defined ruleset including HTTP request rules and HTTP response rules;
a configuration tool configured to enable a user to configure the HTTP request rules and HTTP response rules of the user-defined ruleset, wherein the configuration tool receives input from the user defining one or more of the HTTP request rules or the HTTP response rules of the user-defined ruleset using a syntax that allows the user to specify a test condition and an action statement for each of the rules;
a request processor configured to receive an incoming HTTP request from the client, apply at least one of the HTTP request rules to the incoming HTTP request to detect the test condition specified by the at least one of the HTTP request rules, to thereby produce a modified HTTP request in accordance with the action statement specified by the at least one of the HTTP request rules, and send the modified HTTP request to the server; and a response processor configured to receive an HTTP response to the modified HTTP request from the server, apply at least one of the HTTP response rules to the HTTP response to detect the test condition specified by the at least one of the HTTP response rules, to thereby produce a modified HTTP response in accordance with the action statement specified by the at least one of the HTTP response rules, and send the modified HTTP response to the client.

2. The networking device of claim 1, wherein at least one of the HTTP request rules is configured to detect a test condition of a request header.

3. The networking device of claim 1, wherein at least one of the HTTP request rules is configured to detect a test condition of a request URL.

4. The networking device of claim 1, wherein at least one of the HTTP request rules is configured to detect a test condition of a request query.

5. The networking device of claim 1, wherein at least one of the HTTP response rules is configured to detect a test condition of a response header.

6. The networking device of claim 1, wherein at least one of the HTTP response rules is configured to detect a test condition of response content contained in an entity-body of an HTTP response.

7. The networking device of claim 1, wherein the HTTP request rules include one or more request connection rules configured to instruct the networking device to detect a test condition of an HTTP request and if the test condition is met to take a predetermined action relating to the connection over which the HTTP request has been received.

8. The networking device of claim 7, wherein the HTTP request rules include one or more request parameter rules configured to instruct the networking device to detect a test condition of the HTTP request and if the test condition is met to take a predetermined action relating to a header of the HTTP request.

9. The networking device of claim 8, wherein the request processor is configured to apply the request connection rule prior to applying the request parameter rule.

10. The networking device of claim 1, wherein the HTTP response rules include one or more response header rules configured to instruct the networking device to detect a test condition of the HTTP response and if the test condition is met to take a predetermined action relating to a header of the HTTP response.

11. The networking device of claim 10, wherein the test condition includes detecting that the HTTP response indicates that the request has failed.

12. The networking device of claim 11, wherein the predetermined action is to retry the request to the same server.

13. The networking device of claim 11, wherein the predetermined action is to retry the request to a different server.

14. The networking device of claim 11, wherein the HTTP response rule predicates taking a selected predetermined action based on the existence of the parameter in the HTTP response.

15. The networking device of claim 10, wherein the HTTP response rules include one or more response content rules configured to instruct the networking device to detect a test condition of the HTTP response and if the test condition is met to take a predetermined action relating to content of the HTTP response.

16. The networking device of claim 15, wherein the response processor is configured to apply the response header rule prior to applying the response content rule.

17. The networking device of claim 1, wherein the HTTP request is an HTTPS request.

18. The networking device of claim 1, wherein the response processor is configured to add a compact policy code to the HTTP response.

19. A networking method for use with a networking device positioned intermediate a client and a server on a computer network, the method comprising:

presenting a configuration tool with the network device to receive input from a user defining one or more HTTP request rules using a syntax that allows the user to specify a test condition and an action statement for each of the one or more HTTP request rules;

providing a user-defined ruleset executable by the networking device, the ruleset including the at least one HTTP request rule;

receiving an incoming HTTP request from the client at the networking device;

applying the at least one HTTP request rule to the incoming HTTP request to detect the test condition of the one of the HTTP request rules;

upon detecting the test condition, producing a modified HTTP request in accordance with the action statement of the one of the HTTP request rules; and sending the modified HTTP request to the server.

20. The networking method of claim 19,
wherein the HTTP request rules include one or more request connection rules configured to instruct the networking device to detect the test condition of an HTTP request and if the test condition is met to take a predetermined action specified by the action statement, and
wherein the predetermined action relates to the connection over which the HTTP request has been received.

21. The networking method of claim 20,
wherein the HTTP request rules include one or more request parameter rules configured to instruct the networking device to detect the test condition of the HTTP request and if the test condition is met to take a predetermined action specified by the action statement, and
wherein the predetermined action relates to a header of the HTTP request.

22. The networking method of claim 21, wherein in applying the HTTP request rules, request connection rules are applied prior to applying request parameter rules.

23. The networking method of claim 19,
wherein presenting the configuration tool further comprises presenting the configuration tool to receive input from a user defining one or more HTTP response rules using, for each of the HTTP request rules, a syntax that specifies a test condition and an action statement;
wherein the user-defined ruleset further includes the HTTP response rules, the method further comprising:
receiving an HTTP response to the modified HTTP request from the server;
applying the HTTP response rules to the HTTP response to detect the test condition;
upon detecting the test condition, producing a modified HTTP response in accordance with the action statement of the corresponding one of the HTTP response rules; and
sending the modified HTTP response to the client.

24. The networking method of claim 23,
wherein the HTTP response rules include one or more response header rules configured to instruct the networking device to detect the test condition of the HTTP response and if the test condition is met to take a predetermined action specified by the action statement of the corresponding header rules, and wherein the predetermined action relates to a header of the HTTP response.

25. The networking method of claim 24, wherein the HTTP response rules include one or more response content rules configured to instruct the networking device to detect the test condition of the HTTP response and if the test condition is met to take a predetermined action specified by the action statement of the corresponding header rules, and wherein the predetermined action relates to content of the HTTP response.

26. The networking method of claim 25, wherein in applying the HTTP response rules, response header rules are applied prior to applying response content rules.

27. A networking device positioned intermediate a client and server on a computer network, the networking device comprising:

a user-defined ruleset including HTTP request rules and HTTP response rules;

a configuration tool configured to enable a user to configure the HTTP request rules and HTTP response rules of the user-defined ruleset, wherein the configuration tool receives input from the user defining one or more of the HTTP request rules or the HTTP response rules of the user-defined ruleset using a syntax that allows the user to specify a test condition and an action statement for each of the rules;

a request processor configured to receive an incoming HTTP request from the client, apply HTTP request rules to the incoming HTTP request, to thereby produce a modified HTTP request, and send the modified HTTP request to the server; and a response processor configured to receive an HTTP response to the modified HTTP request from the server, apply the HTTP response rules to the HTTP response, to thereby produce a modified HTTP response, and send the modified HTTP response to the client;

wherein the HTTP request rules include (a) request connection rules configured to instruct the networking device to detect the test condition of an HTTP request and if the test condition is met to take a predetermined action specified by the corresponding action statement relating to the connection over which the HTTP request has been received, and (b) request parameter rules configured to instruct the networking device to detect the test condition of the HTTP request and if the test condition is met to take a predetermined action specified by the corresponding action statement relating to a header of the request, and wherein the HTTP response rules include (c) response header rules configured to instruct the networking device to detect the test condition and if the test condition is met take a predetermined action specified by the corresponding action statement relating to a header of the response, and (d) response content rules configured to instruct the networking device to detect the test condition and if the test condition is met take a predetermined action specified by the corresponding action statement relating to content of the request.

* * * * *